(12) United States Patent
Moon et al.

(10) Patent No.: US 10,983,617 B2
(45) Date of Patent: Apr. 20, 2021

(54) TOUCH SENSING UNIT AND DISPLAY DEVICE INCLUDING THE SAME

(71) Applicant: SAMSUNG DISPLAY CO., LTD., Yongin-si (KR)

(72) Inventors: Dong Jin Moon, Cheonan-si (KR); In Young Han, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 5 days.

(21) Appl. No.: 16/273,504

(22) Filed: Feb. 12, 2019

(65) Prior Publication Data
US 2020/0089355 A1 Mar. 19, 2020

(30) Foreign Application Priority Data
Sep. 19, 2018 (KR) .................. 10-2018-0112038

(51) Int. Cl.
*G06F 3/044* (2006.01)
*G06F 3/041* (2006.01)
(52) U.S. Cl.
CPC .......... *G06F 3/0412* (2013.01); *G06F 3/044* (2013.01); *G06F 2203/04103* (2013.01); *G06F 2203/04112* (2013.01)
(58) Field of Classification Search
None
See application file for complete search history.

(56) References Cited

U.S. PATENT DOCUMENTS

2011/0048812 A1\* 3/2011 Yilmaz ................ G06F 3/0443
178/18.06
2012/0081333 A1\* 4/2012 Ozeki ................... G06F 3/0443
345/174
2018/0067599 A1 3/2018 Cai et al.
2018/0129111 A1 5/2018 Wu et al.
2018/0157358 A1\* 6/2018 Lin ....................... G02F 1/1368

FOREIGN PATENT DOCUMENTS

| CN | 107291303 | 10/2017 |
|---|---|---|
| CN | 107656651 | 2/2018 |
| CN | 108509076 | 9/2018 |
| KR | 102014-0016071 | 2/2014 |

OTHER PUBLICATIONS

Extended European Search Report dated Sep. 17, 2019 for Application Serial No. 19165683.4.

\* cited by examiner

*Primary Examiner* — Carl Adams
(74) *Attorney, Agent, or Firm* — F. Chau & Associates, LLC

(57) ABSTRACT

A touch sensing unit includes a base layer having defined thereon a first sensing area, a second sensing area, and a third sensing area. The second and third sensing areas protrude from the first sensing area in a first direction and are spaced apart from each other. A non-sensing area is adjacent to the first, second, and third sensing areas. A first detection electrode is disposed within the first sensing area. A second detection electrode is disposed within the second sensing area. A third detection electrode is disposed within the third sensing area. First, second, and third signal wires are electrically connected to the first, second, and third detection electrodes, respectively. The first and second signal wires are disposed adjacent to a first edge of the non-sensing area. The third signal wire is disposed adjacent to a second edge of the non-sensing area.

27 Claims, 21 Drawing Sheets

TOUCH SENSING UNIT AND DISPLAY DEVICE INCLUDING THE SAME

This application claims the benefit of and priority to Korean Patent Application No. 10-2018-0112038, filed on Sep. 19, 2018, in the Korean Intellectual Property Office, the disclosure of which is herein incorporated by reference in its entirety.

TECHNICAL FIELD

The present disclosure relates to a display device, and more specifically, to a touch sensing unit and a display device including the same.

DISCUSSION OF THE RELATED ART

Display devices have been incorporated into various different electronic systems, some of which are portable, such as smartphones, and others of which are stationary, such as television sets and computer monitors. In many of these systems, it is desirable to have a relatively large display area with a minimal bezel surrounding the display area. One way to characterize this quality is to describe screen-to-body ratio, where a larger screen-to-body ratio is most desired. In some devices, such as smartphones, various modules such as speakers and optical sensors are disposed on the device's front side. While these modules may be disposed outside of the display screen, in order to increase screen-to-body ratio, these modules may be disposed in a notch or trench shape that has been cut away from the shape of the display screen.

Many devices such as smartphones may utilize a touch-screen display which is capable of not only displaying an image but also sensing a user's touch. These touch-screens may incorporate a touch member disposed over a display panel. The touch member is a sensor apparatus that may be configured to identify a location of a touch event, such as a touch of a finger or stylus, and even a degree of pressure that has been so-applied.

Touch members may utilize one or more different approaches for sensing the touch event. Examples of these approaches may include a resistive film-type method, a light-sensing method, or a capacitive method.

SUMMARY

A touch sensing unit includes a base layer having defined thereon a first sensing area, a second sensing area, and a third sensing area. The second and third sensing areas protrude from the first sensing area in a first direction and are spaced apart from each other. A non-sensing area is adjacent to the first, second, and third sensing areas. A first detection electrode is disposed within the first sensing area. A second detection electrode is disposed within the second sensing area. A third detection electrode is disposed within the third sensing area. First, second, and third signal wires are electrically connected to the first, second, and third detection electrodes, respectively. The first and second signal wires are disposed adjacent to a first edge of the non-sensing area. The third signal wire is disposed adjacent to a second edge of the non-sensing area.

A display device includes a first detection electrode having a plurality of first detection patterns disposed adjacent to one another in a first direction, a second detection electrode having a plurality of second detection patterns disposed adjacent to one another in a second direction, which intersects the first direction, and a third detection electrode having a plurality of third detection patterns disposed adjacent to one another in the second direction. A first signal wire is electrically connected to the first detection electrode. A second signal wire is electrically connected to the second detection electrode. A third signal wire is electrically connected to the third detection electrode. The second detection electrode crosses between the first detection patterns. The second and third detection electrodes are spaced apart from one another and at least partially overlap with each other in the second direction. The second and third signal wires are not disposed between the second and third detection electrodes.

BRIEF DESCRIPTION OF THE DRAWINGS

A more complete appreciation of the present disclosure and many of the attendant aspects thereof will be readily obtained as the same becomes better understood by reference to the following detailed description when considered in connection with the attached drawings, in which.

DETAILED DESCRIPTION

Figure 1:
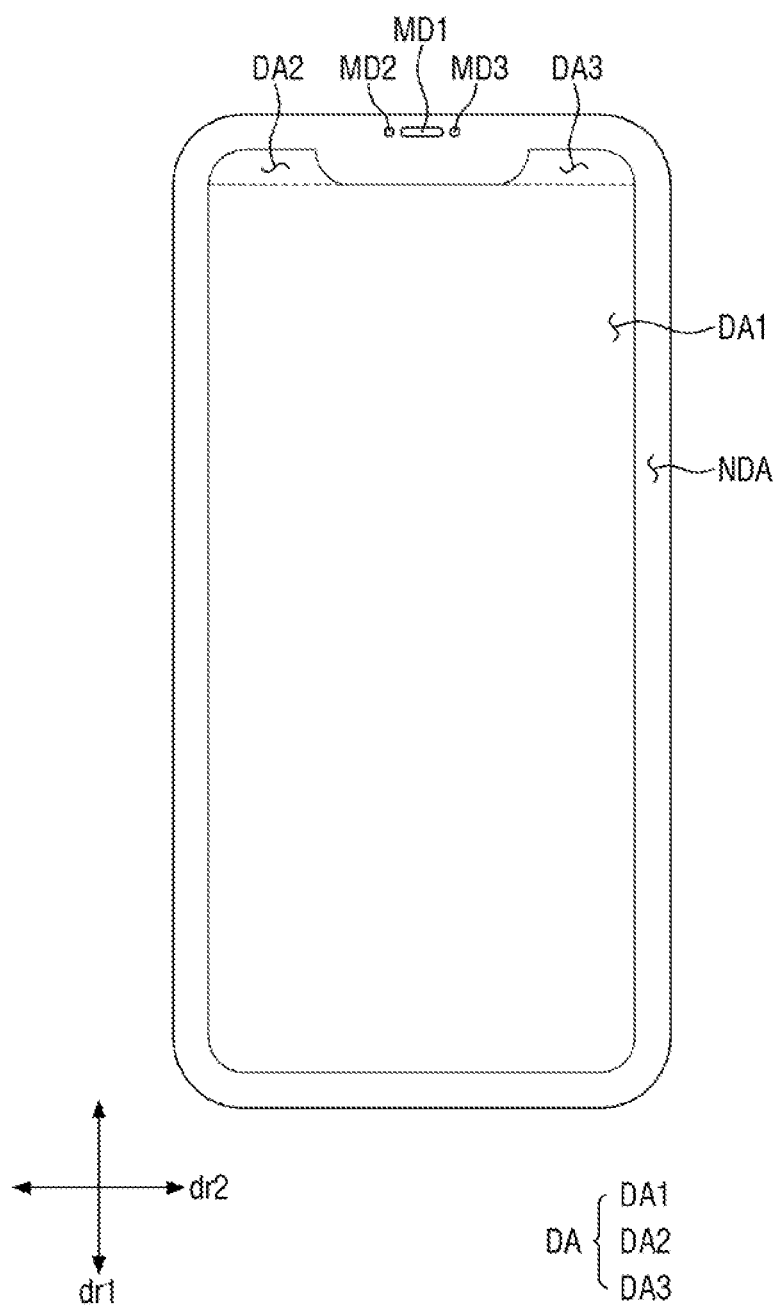
FIG. 1 is a plan view illustrating an organic light-emitting display device according to an exemplary embodiment of the present disclosure.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise.

It will be understood that when an element or layer is referred to as being "on", "connected to" or "coupled to" another element or layer, it can be directly on, connected or coupled to the other element or layer or intervening elements or layers may be present.

It will be understood that, although the terms first, second, etc. may be used herein to describe various elements, components, regions, layers and/or sections, these elements, components, regions, layers and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the inventive concept.

Display devices according to various exemplary embodiments of the present disclosure are devices for displaying images that are moving or still, two-dimensional or stereoscopic. Display devices may be used in mobile electronic devices such as mobile communication terminals, smartphones, tablet PCs, smartwatches, and navigation devices, and also in various other non-mobile products such as televisions (TVs), notebook computers, monitors, billboards, or Internet of Things (IoT) devices.

Exemplary embodiments of the present disclosure will hereinafter be described with reference to the accompanying drawings. In the description that follows, an organic light-emitting display device will be described as an exemplary display device, but the present disclosure is not limited thereto. For example, the inventive concept of the present disclosure is also applicable to other display devices such as a liquid crystal display (LCD) device, a field emission display (FED) device, an electrophoretic display (EPD) device, a quantum dot light-emitting diode (QLED) display device, or a micro light-emitting diode (mLED) display device. In the drawings, like (or similar) reference numerals may indicate like elements.

Figure 2:
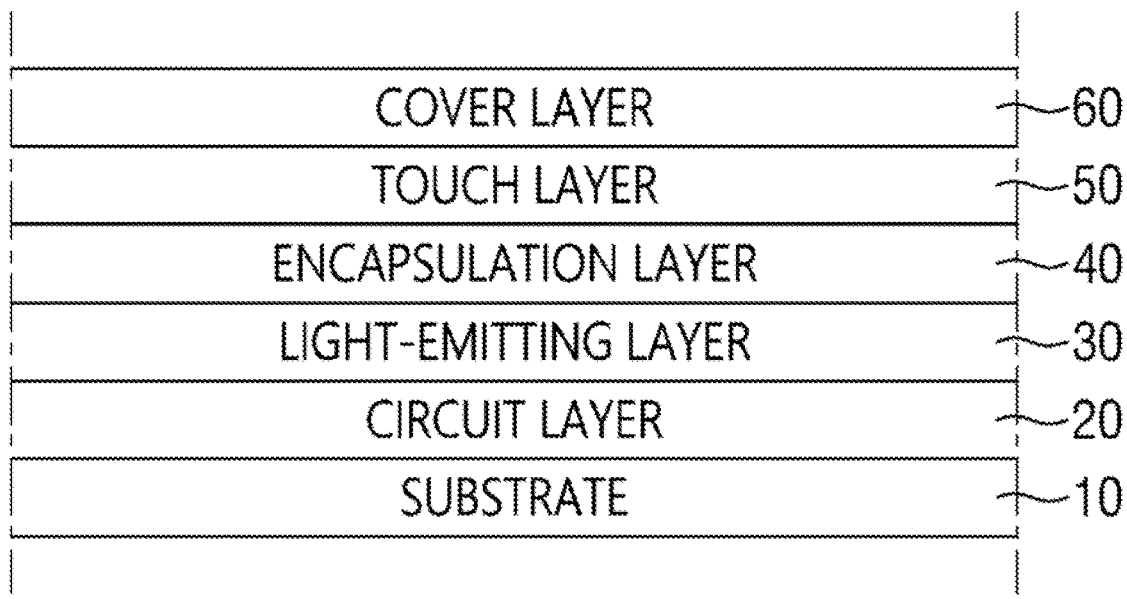
FIG. 2 is a partial cross-sectional view illustrating the organic light-emitting display device of FIG. 1.

FIG. 1 is a plan view illustrating an organic light-emitting display device according to an exemplary embodiment of the present disclosure. FIG. 2 is a partial cross-sectional view of the organic light-emitting display device of FIG. 1.

Referring to FIG. 1, an organic light-emitting display device 1 includes a display area DA and a non-display area NDA.

The display area DA is defined as an area in which an image is displayed. The organic light-emitting display device 1 may include a plurality of pixels disposed in the display area DA. The display area DA may be an area for displaying an image, and may also be an area for recognizing touch input or a fingerprint from a user. In one exemplary embodiment of the present disclosure, the display area DA may have an edge (e.g., an upper edge in the example of FIG. 1) that is partially recessed. For example, one edge, in a first direction dr1, of the display area DA may be formed into an irregular shape to have a bay, notch, or trench shape in a plan view. Here, the irregular edge of the display area DA may include two protruding parts protruding outwardly from the display area DA and a recessed part recessed into the display area DA.

As used herein, a vertical direction of figures such as FIG. 1 will be defined as the first direction dr1, and a direction that intersects the first direction dr1 will be defined as a second direction dr2. For example, the second direction dr2 may correspond to a horizontal direction of figures such as FIG. 1. However, the present disclosure is not limited to this. Instead, the first and second directions dr1 and dr2 should be understood as being relative directions that intersect each other. For convenience, in the accompanying drawings, the upper side, the lower side, the left side, and the right side will be defined as a first side in the first direction dr1, a second side in the first direction dr1, a first side in the second direction dr2, and a second side in the second direction dr2, but should be understood as being relative locations. As shown in FIG. 1, the first and second directions dr1 and dr2 may be perpendicular with respect to each other, but this is not necessarily the case as they may alternatively meet at angles other than right angles.

In one exemplary embodiment of the present disclosure, the display area DA may include a first display area DA1 and second and third display areas DA2 and DA3, which protrude from the first display area DA1 toward the first side in the first direction dr1. The second display area DA2 may be an area disposed at the upper left corner of the first display area DA1, and the third display area DA3 may be an area disposed at the upper right corner of the first display area DA1. The second and third display areas DA2 and DA3 may be spaced apart from each other in the second direction dr2.

The two protruding parts of the irregular edge of the display area DA may be formed by the second and third display areas DA2 and DA2. Also, a recessed part of the display area DA may be formed by the upper edge of a part of the first display area DA1 between the second and third display areas DA2 and DA3.

The non-display area NDA is defined as an area in which no image is displayed. The non-display area NDA may at least partially surround the display area DA. For example, the non-display area NDA may at least partially surround one or more of the first through third display areas DA1 through DA3.

In one exemplary embodiment of the present disclosure, the non-display area NDA may have a substantially rectangular shape with rounded corners, but the present disclosure is not limited thereto. The non-display area NDA may include a central area, which is a part of the non-display area NDA between the second and third display areas DA2 and DA3. The non-display area NDA may include a rectangular frame with rounded corners and a protruding part formed by the second and third display areas DA2 and DA3 that encroaches upon the display area DA.

A speaker module MD1, a camera module MD2, and a sensor module MD3 may be disposed in a part of the non-display area NDA. In one exemplary embodiment of the present disclosure, the speaker module MD1, the camera module MD2, and the sensor module MD3 may be disposed in an upper part of the central area of the non-display area NDA near the upper edge of the non-display area NDA. As will be described later, various wires, which bypass the speaker module MD1, the camera module MD2, and the sensor module MD3, may pass through the protruding part of the non-display area NDA. In one exemplary embodiment of the present disclosure, the sensor module MD3 may include a lighting sensor, a proximity sensor, an infrared sensor, and/or an ultrasonic sensor. The arrangement of the speaker module MD1, the camera module MD2, and the sensor module MD3 is not particularly limited.

Referring to FIG. 2, in one exemplary embodiment of the present disclosure, the organic light-emitting display device 1 may include a substrate 10, a circuit layer 20 disposed on the substrate 10, a light-emitting layer 30 disposed on the circuit layer 20, an encapsulation layer 40 disposed on the light-emitting layer 30, a touch layer 50 disposed on the encapsulation layer 40, and a cover layer 60 disposed on the touch layer 50, but the present disclosure is not limited thereto. Each layer of the organic light-emitting display device 1 may have a multilayer or single-layer structure. Also, some of the layers of the organic light-emitting display device 1 may be omitted, or other layers may be newly added to the organic light-emitting display device 1. The stack structure of the organic light-emitting display device 1 will be described later with reference to FIGS. 7 and 8.

The touch layer 50 may include a touch sensing unit 501 sensing touch input from the user. The arrangement of the elements of the touch layer 50 will hereinafter be described with reference to FIGS. 3 and 4.

Figure 3:
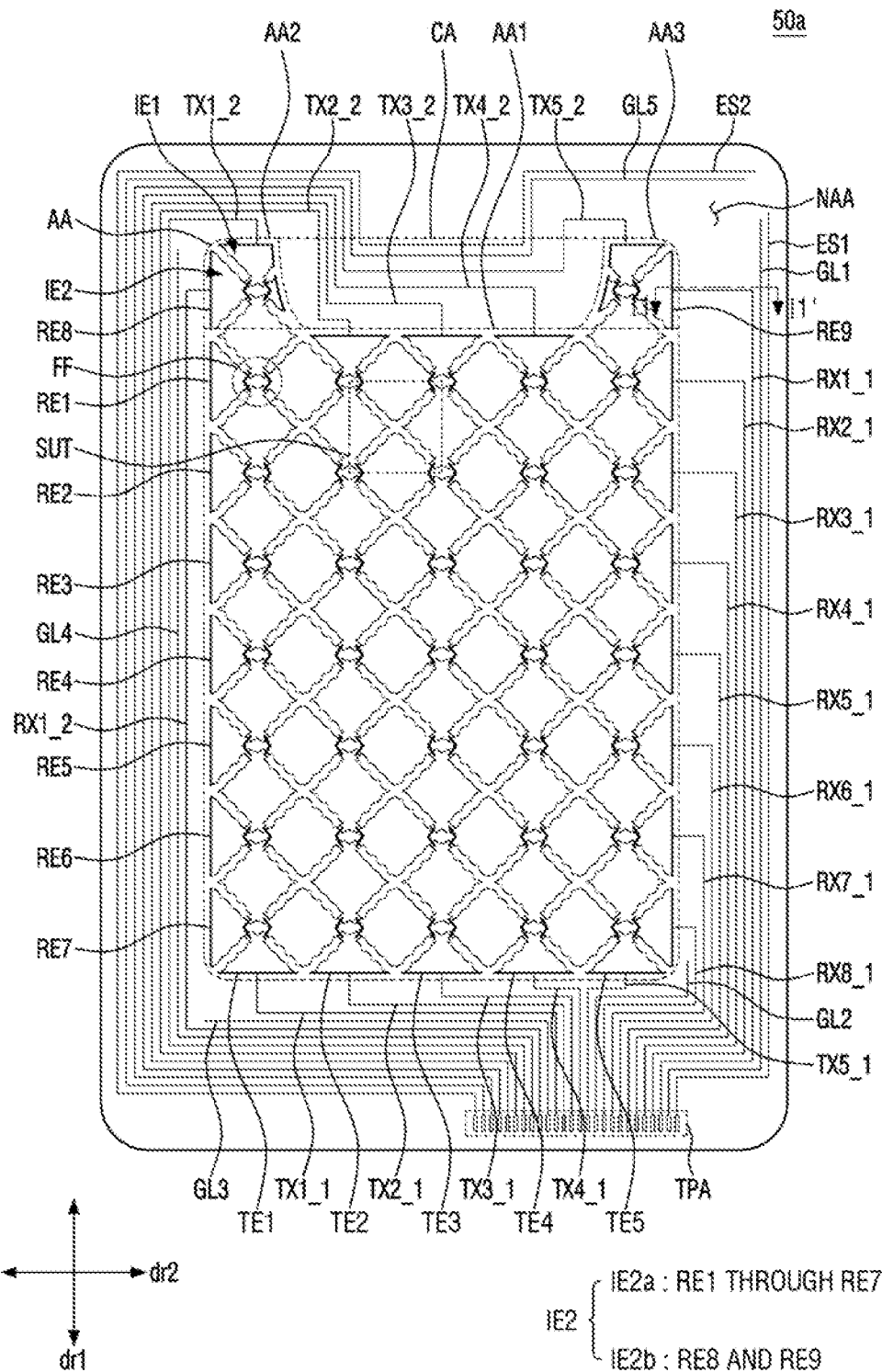
FIG. 3 is a schematic layout view illustrating the layout of a touch sensing unit.
Figure 4:
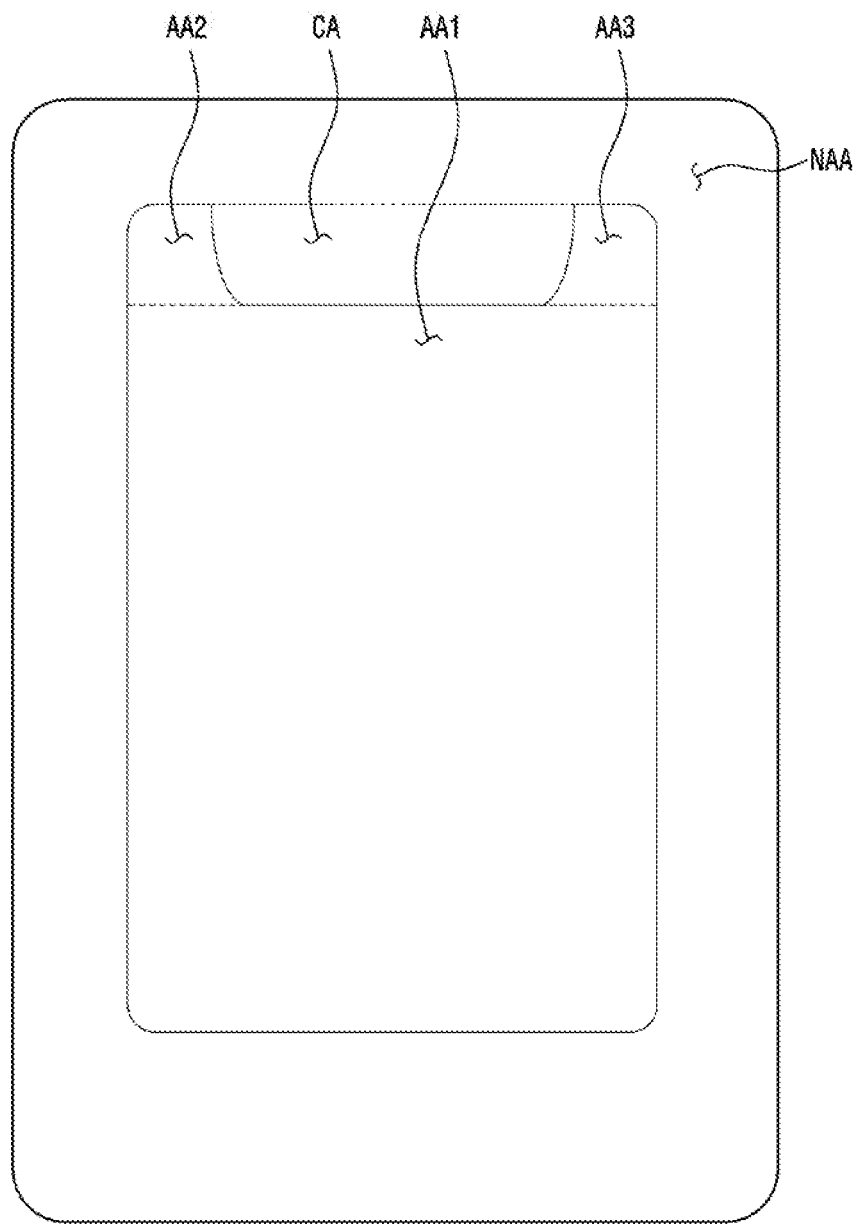
FIG. 4 is a schematic plan view illustrating each region on a base.
Figure 5:
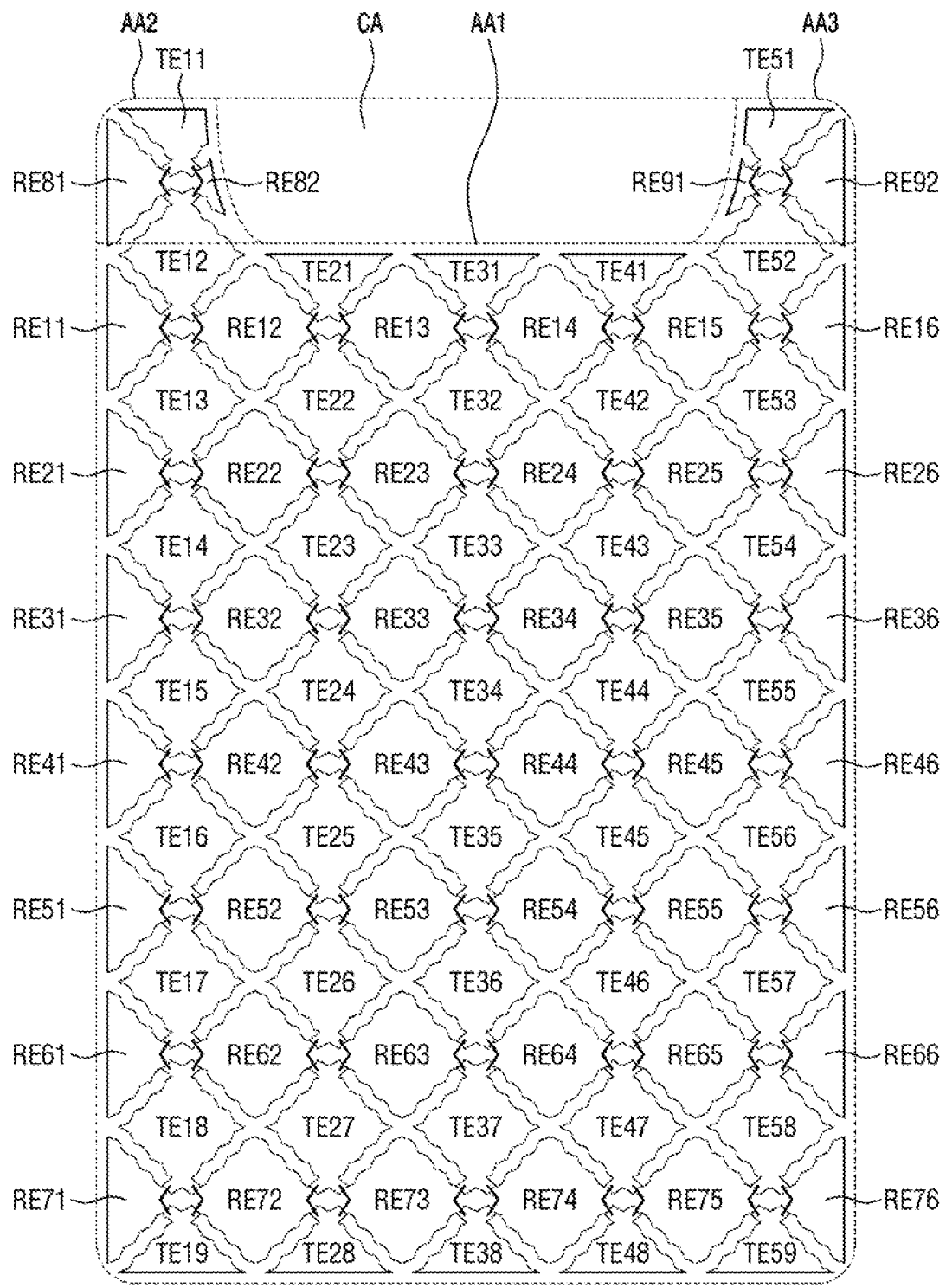
FIG. 5 is an enlarged layout view illustrating a detection electrode unit of FIG. 3.
Figure 6:
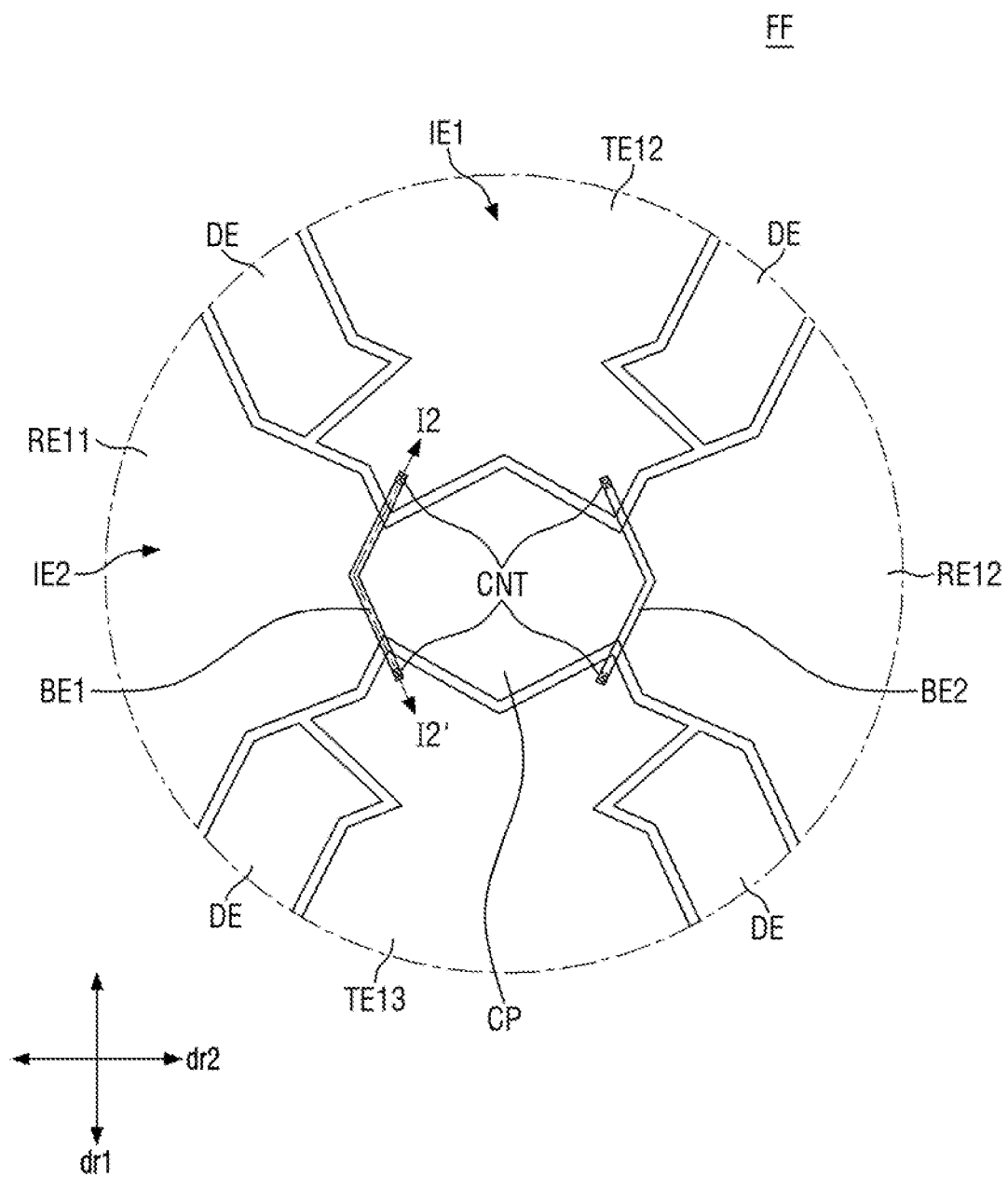
FIG. 6 is an enlarged view illustrating an area FF of FIG. 3.

FIG. 3 is a schematic layout view illustrating the layout of a touch sensing unit. FIG. 4 is a schematic plan view illustrating each region on a base. FIG. 5 is a layout view illustrating a detection electrode unit of FIG. 3. FIG. 6 is an enlarged view illustrating an area FF of FIG. 3.

Referring to FIGS. 3 through 6, a touch sensing unit 50a includes a touch member, a pad terminal unit TPA, and a base on which the touch member and the pad terminal unit TPA are disposed. The touch member includes a detection electrode unit (IE1 and IE2) and a signal wiring unit (TX, RX, ES, and GL) connected to the detection electrode unit (IE1 and IE2). The signal wire unit (TX, RX, ES, and GL) may be disposed in a non-sensing area NAA and may at least partially surround the detection electrode unit (IE1 and IE2). For convenience of illustration, various features of the non-sensing area NAA where the signal wiring unit (TX, RX, ES, and GL) is disposed may be exaggerated in FIGS. 3 through 6.

The base may be a layer in which the touch member and the pad terminal unit TPA are disposed. In one exemplary embodiment of the present disclosure, the base may be the encapsulation layer 40. In an exemplary embodiment of the present disclosure, the organic light-emitting display device 1 may further include a touch base on which the touch member and the pad terminal unit TPA are disposed, and the touch base may be referred to as the base. The base may include a plurality of regions, and at least two of the regions may have differently sized areas. The base may have substantially the same shape as the organic light-emitting display device 1. In one exemplary embodiment of the present disclosure, a sensing area AA and the non-sensing area NAA, which at least partially surrounds the sensing area AA, may be defined on the base. The sensing area AA may include first through third sensing areas AA1 through AA3.

The sensing area AA may have substantially the same shape as the display area DA. The sensing area AA may include an irregular edge that is partially recessed into the sensing area AA. The first through third sensing areas AA1 through AA3 may have the same shapes as the first through third display areas DA1 through DA3, respectively. For example, the sensing area AA may include the first sensing area AA1, and the second and third sensing areas AA2 and AA3, which protrude from the first sensing area AA1 toward the first side in the first direction dr1. The second and third sensing areas AA2 and AA3 may at least partially overlap with each other in the second direction dr2.

The non-sensing area NAA may surround the first through third sensing areas AA through AA3 and may have substantially the same shape as the non-display area NDA. The non-sensing area NAA may include a central area CA disposed between the second and third sensing areas AA2 and AA3 and overlapping with the second and third sensing areas AA2 and AA3 in the second direction dr2.

The detection electrode unit (IE1 and IE2) may include a plurality of first touch detection electrodes IE1 extending in the first direction dr1 and a plurality of second touch detection electrodes IE2 intersecting at least one of the first touch detection electrodes IE1. The second touch detection electrodes IE2 may extend in the second direction dr2. In one exemplary embodiment of the present disclosure, the detection electrode unit (IE1 and IE2) may be disposed in the sensing area AA, but the present disclosure is not limited thereto.

The detection electrode unit (IE1 and IE2) may include sensing electrodes and driving electrodes. The term "detection electrode unit" or "detection electrode", as used herein, may collectively refer to both a sensing electrode and a driving electrode. In the exemplary embodiment of FIGS. 3 through 6, the first touch detection electrodes IE1 may be driving electrodes, and the second touch detection electrodes IE2 may be sensing electrodes. The first touch detection electrodes IE1 may include five driving electrodes, i.e., first through fifth driving electrodes TE1 through TE5, and the second touch detection electrodes IE2 may include nine sensing electrodes, i.e., first through ninth sensing electrodes RE1 through RE9. However, the numbers of first touch detection electrodes IE1 and second touch detection electrodes IE2 are not particularly limited.

The first touch detection electrodes IE1 may extend in the first direction dr1, and the second touch detection electrodes IE2 may extend in the second direction dr2. In one exemplary embodiment of the present disclosure, the length, in the first direction dr1, of the first touch detection electrodes IE1 may be greater than the length, in the second direction dr2, of the so second touch detection electrodes IE2, in which case, the organic light-emitting display device 1 may be longer in the first direction dr1 than in the second direction dr2.

In one exemplary embodiment of the present disclosure, the first touch detection electrodes IE1 may include the first driving electrode TE1, which extends from the second sensing area AA2 toward the second side in the first direction dr1, the fifth driving electrode TE5, which extends from the third sensing area AA3 toward the second side in the first direction dr1, and the second, third, and fourth driving electrodes TE2, TE3, and TE4, which are disposed between the first and fifth driving electrodes TE1 and TE5. The first and fifth driving electrodes TE1 and TE5 may extend from the second and third sensing areas AA2 and AA3, respectively, to the first sensing area AA1.

The first touch detection electrodes IE1 may be disposed adjacent to, and spaced apart from, one another in the second direction dr2. For example, the first through fifth driving electrodes TE1 through TE5 may be sequentially arranged in the second direction dr2 and may be spaced apart from one another. The first and fifth driving electrodes TE1 and TE5 may be disposed adjacent to first and second edges, in the second direction dr2, of the sensing area AA.

The first touch detection electrodes IE1 may include driving electrodes having different lengths in the first direction dr1. For example, the length, in the first direction dr1, of the first and fifth driving electrodes TE1 and TE5, which extend from the second and third sensing areas AA2 and AA3 to the first sensing area AA1, may be greater than the length, in the first direction dr1, of the second through fourth driving electrodes TE2 through TE4, which extend only within the first sensing area AA1.

Each driving electrode may include at least one driving detection pattern. For example, each of the first and fifth driving electrodes TE1 and TE5 may include first through ninth driving detection patterns TE11 through TE19 or TE51 through TE59, which are sequentially arranged in the first direction dr1 and may be spaced apart from one another. Each of the second through fourth driving electrodes TE2 through TE4 may include first through eighth driving detection patterns TE21 through TE28, TE31 through TE38, or TE41 through TE48, which are sequentially arranged in the first direction dr1 and may be spaced apart from one another.

The first driving detection pattern TE11 of the first driving electrode TE1 and the first driving detection pattern TE51 of the fifth driving electrode TE5 may be disposed in the second and third sensing areas AA2 and AA3, respectively, and thus might not overlap with the second through fourth driving electrodes TE2 through TE4 in the second direction dr2. The second through ninth driving detection patterns TE12 through TE19 of the first driving electrode TE1 and the second through ninth driving detection patterns TE52 through TE59 of the fifth driving electrode TE5 may at least partially overlap with the first through eighth driving detection patterns TE21 through TE28 of the second driving electrode TE2, the first through eighth driving detection patterns TE31 through TE38 of the third driving electrode TE3, and the first through eighth driving detection patterns TE41 through TE48 of the fourth driving electrode TE4 in the second direction dr2. In one exemplary embodiment of the present disclosure, the second driving detection pattern TE12 of the first driving electrode TE1 may be disposed in the first and second sensing areas AA1 and AA2 and may include the boundary between the first and second sensing areas AA1 and AA2, and the second driving detection pattern 52 of the fifth driving electrode TE5 may be disposed in the first and third sensing areas AA1 and AA3 and may include the boundary between the first and third sensing areas AA1 and AA3. The first and fifth driving electrodes TE1 and TE5 may have areas in which they overlap with the second through fourth driving electrodes TE2 through TE4 in the second direction dr2 and areas in which they do not overlap with the second through fourth driving electrodes TE2 through TE4 in the second direction dr2. The first and fifth driving electrodes TE1 and TE5 may at least partially overlap with each other in the second direction dr2 in the areas where they do not so overlap with the second through fourth driving electrodes TE2 through TE4.

The second touch detection electrodes IE2 may include a first sub-touch detection electrode unit IE2a, which extends continuously from a first edge to a second edge, in the second direction dr2, of the first sensing area AA1 along the second direction dr2, and a second sub-touch detection electrode unit IE2b, which is disposed between the second and third sensing areas AA2 and AA3. Each of the first and second sub-touch detection electrode units IE2a and IE2b may include at least one sensing electrode. In one exemplary embodiment of the present disclosure, the first sub-touch detection electrode unit IE2a may include first through seventh sensing electrodes RE1 through RE7, and the second sub-touch detection electrode unit EI2b may include eighth and ninth sensing electrodes RE8 and RE9.

The first through seventh sensing electrodes RE1 through RE7 of the first sub-touch detection electrode unit IE2a may be disposed adjacent to, and spaced apart from, one another in the first direction dr1. For example, the first through seventh sensing electrodes RE1 through RE7 of the first sub-touch detection electrode unit IE2a may be sequentially arranged in the first direction dr1 and may be spaced apart from one another.

The second sub-touch detection electrode unit IE2b may be disposed adjacent to the first sub-touch detection electrode unit IE2a in the first direction dr1. In one exemplary embodiment of the present disclosure, the eighth and ninth sensing electrodes RE8 and RE9 of the second sub-touch detection electrode unit IE2b may be adjacent to, and spaced apart from, a first side, in the first direction dr1, of the first sensing electrode RE1.

In one exemplary embodiment of the present disclosure, the first through seventh sensing electrodes RE1 through RE7 may have the same length in the second direction dr2. The first and second sub-touch detection electrode units IE2a and IE2b may have different lengths in the second direction dr2. For example, the length, in the second direction dr2, of the first sub-touch detection electrode unit IE2a may be greater than the length, in the second direction dr2, of the second sub-touch detection electrode unit IE2b.

The second sub-touch detection electrode unit IE2b may have the same shape as a shape obtained by cutting off a middle part of the first sensing electrode RE1. For example, the second sub-touch detection electrode unit IE2b may have the same shape as the combination of both end portions of the first sensing electrode RE1.

The second sub-touch detection electrode unit IE2b may include the eighth sensing electrode RE8, which is disposed in the second sensing area AA2, and the ninth sensing electrode RE9, which is disposed in the third sensing area AA3. The eighth and ninth sensing electrodes RE8 and RE9 may be disposed on the same imaginary straight line extending in the second direction dr2. For example, the eighth and ninth sensing electrodes RE8 and RE9 may be spaced apart from, and at least partially overlap with, each other in the second direction dr2.

Each of the first through ninth sensing electrodes RE1 through RE9 may include at least one sensing detection pattern. For example, each of the first through seventh sensing electrodes RE1 through RE7 may include first through sixth sensing detection patterns RE11 through RE16, RE21 through RE26, RE31 through RE36, RE41 through RE46, RE51 through RE56, RE61 through RE66, or RE71 through RE76, which are sequentially arranged in the second direction dr2. Each of the eighth and ninth sensing electrodes RE8 and RE9 may include first and second sensing detection patterns RE81 and RE82 or RE91 and RE92, which are spaced apart from each other in the second direction dr2. The first and second sensing detection patterns RE81 and RE82 of the eighth sensing electrode RE8 may have differently sized areas. The area of the first sensing detection pattern RE81 of the eighth sensing electrode RE8 may be greater than the area of the second sensing detection pattern RE82 of the eighth sensing electrode RE8. Similarly, the first and second sensing detection patterns RE91 and RE92 of the ninth sensing electrode RE9 may have differently sized areas. The area of the first sensing detection pattern RE91 of the ninth sensing electrode RE9 may be greater than the area of the second sensing detection pattern RE92 of the ninth sensing electrode RE9.

Each pair of adjacent sensing electrodes in the second direction dr2 may be physically connected via connecting portions CP. The connecting portions CP may cross between each pair of adjacent driving detection patterns so that each pair of adjacent driving detection patterns can be physically separated. For example, the first and second sensing detection patterns RE11 and RE12 of the first sensing electrode RE1 may be physically connected via a connecting portion CP, but due to the connecting portion CP, the second and third driving detection patterns TE12 and TE13 of the first driving electrode TE1 may be physically separated. The pairs of adjacent driving sensing detection patterns may be electrically connected via bridge electrodes BE.

The first and second sensing detection patterns RE81 and RE82 of the eighth sensing electrode RE8 may be physically connected to each other and may cross between the first and second driving detection patterns TE11 and TE12 of the first driving electrode TE1 to physically separate the first and second driving detection patterns TE11 and TE12 of the first driving electrode TE1. Similarly, the first and second sensing detection patterns RE91 and RE92 of the ninth sensing electrode RE9 may be physically connected to each other and may cross between the first and second driving detection patterns TE51 and TE52 of the fifth driving electrode TE5 to physically separate the first and second driving detection patterns TE51 and TE52 of the fifth driving electrode TE5. The second sensing detection pattern RE82 of the eighth sensing electrode RE8 and the first sensing detection pattern RE91 of the ninth sensing electrode RE9 may be disposed between the first and fifth driving electrodes TE1 and TE5.

The eighth sensing electrode RE8 may extend across the first driving electrode TE1, but not across the second through fifth driving electrodes TE2 through TE5. The ninth sensing electrode RE9 may extend across the fifth driving electrode TE5, but not across the first through fourth driving electrodes TE1 through TE4. The first through seventh sensing electrodes TE1 through TE7 may extend across all the driving electrodes TE1 through TE5.

In one exemplary embodiment of the present disclosure, detection patterns disposed between a pair of detection patterns at both ends of each of the first or second touch detection electrodes IE1 or IE2 may have a rhomboid. The pair of detection patterns at both ends of each of the first or second touch detection electrodes IE1 or IE2 may have the shape of an equilateral triangle obtained by cutting the rhombus into halves. Each of the driving detection patterns TE11 through TE59 and each of the sensing detection patterns RE11 through RE92 may have at least one side formed in a zigzag shape. For example, the second driving detection pattern TE12, which has a rhomboid shape, and the first sensing detection pattern RE11, which also has a rhomboid shape, may have all sides formed in a zigzag shape. For example, the first driving detection pattern TE12, which has an equilateral triangular shape, and the first sensing detection pattern RE11, which also has an equilateral triangular shape, may have two sides formed in a zigzag shape and the other side formed as a straight line. In a case where each of the driving detection patterns TE11 through TE59 and each of the sensing detection patterns RE11 through RE92 include zigzag-shaped sides, moiré can be prevented, and display defects that may be caused to the organic light-emitting display device 1 by moiré can be prevented.

There may exist gaps between the first touch detection electrodes IE1 and the second touch detection electrodes IE2. The first touch detection electrodes IE1 and the second touch detection electrodes IE2 may be spaced apart, and insulated, from one another by the gaps. The gaps may refer to spaces formed between the first touch detection electrodes IE1 and the second touch detection electrodes IE2, which are physically separate from one another. An insulating material may be disposed in the gaps.

Referring to FIG. 6, in each of the first touch detection electrodes IE1, e.g., in the first driving electrode TE1, a pair of bridge electrodes BE1 and BE2 may electrically connect a pair so of adjacent driving detection patterns in the first direction dr1, e.g., the second and third driving detection patterns TE12 and TE13. The bridge electrodes BE1 and BE2 may connect the corners of the second driving detection pattern TE12 and the corners of the third driving detection pattern TE13.

The bridge electrodes BE1 and BE2 may extend across one of the second touch detection electrodes IE2. For example, the bridge electrodes BE1 and BE2 may include parts overlapping with one of the second touch detection electrodes IE2, e.g., the first sensing electrode RE1. The bridge electrodes BE1 and BE2 may be insulated from the first sensing electrode RE1.

A first touch insulating layer 511 may be included between the bridge electrodes BE1 and BE2 and the first sensing electrode RE1. The first touch insulating layer 511 may be disposed on the bridge electrodes BE1 and BE2, in which case, the first touch insulating layer 511 may include a plurality of contact holes CNT, which expose parts of the bridge electrodes BE1 and BE2 at or near first ends and second ends of the bridge electrodes BE1 and BE2. The contact holes CNT may at least partially overlap with the first sensing electrode RE1. The first sensing electrode RE1 may be physically connected to the bridge electrodes BE1 and BE2 via the contact holes CNT. Accordingly, a pair of adjacent driving detection patterns of the first sensing electrode RE1, e.g., the second and third driving detection patterns TE12 and TE13, may be electrically connected.

The first ends of the bridge electrodes BE1 and BE2 may extend in a third direction, and the second ends of the bridge electrodes BE1 and BE2 may extend in a fourth direction. In one exemplary embodiment of the present disclosure, the third and fourth directions may be directions inclined with respect to the first and second directions dr1 and dr2, but the present disclosure is not limited thereto. The third and fourth directions may be symmetrical with each other with respect to an imaginary central line extending in the second direction dr2. For example, the bridge electrodes BE1 and BE2 may be disposed in a bent shape such as the shape of "<" or ">". In an exemplary embodiment of the present disclosure, the third direction may be an upward extension of the first direction dr1, and the fourth direction may be a downward extension of the first direction dr1. In this exemplary embodiment of the present disclosure, the bridge electrodes BE1 and BE2 may have a rectilinear shape. In an exemplary embodiment of the present disclosure, the bridge electrodes BE1 and BE2 may have no angled corners and may be disposed in a bent shape with no angled corner such as the shape of "(" or ")".

At least one bridge electrode may be provided so as to connect the second and third driving detection patterns TE12 and TE13 of the first driving electrode TE1 to one another. In one exemplary embodiment of the present disclosure, two bridge electrodes BE1 and BE2 may be provided so as to connect the second and third driving detection patterns TE12 and TE13. In this exemplary embodiment of the present disclosure, even if one of the two bridge electrodes BE1 and BE2 is disconnected, the second and third driving detection patterns TE12 and TE13 may remain electrically connected due to the other bridge electrode. The two bridge electrodes BE1 and BE2 may be symmetrical with each other with respect to an imaginary central line extending in the first direction dr1.

In each of the second touch detection electrodes IE2, e.g., in the first sensing electrode RE1, a connecting portion CP may be disposed between a pair of adjacent sensing detection patterns, e.g., the first and second sensing detection patterns RE11 and RE12, and may also be disposed between a pair of adjacent driving detection patterns, e.g., the second and third touch detection patterns TE12 and TE13 of the first driving electrode TE1, which are adjacent to, and separate from, each other.

Pairs of adjacent driving detection patterns of each of the first touch detection electrodes IE1 and pairs of sensing detection patterns of each of the second touch detection electrodes IE2 may form unit sensing areas SUT. For example, in an area where one of the first touch so detection electrodes IE1 and one of the second touch detection electrodes IE2 intersect each other, the halves of a pair of adjacent driving detection patterns in the second direction dr2, e.g., the halves of the second driving detection patterns TE22 and TE32 of the second and third driving electrodes TE2 and TE3, and the halves of a pair of adjacent sensing detection patterns in the first direction dr1, e.g., the halves of the third sensing detection patterns RE13 and RE23 of the first and second sensing electrodes RE1 and RE2, may form a single unit sensing area SUT, which has a square or rectangular shape. The unit sensing areas SUT may be arranged in row and column directions.

The unit sensing areas SUT may detect touch input by measuring capacitances between pairs of adjacent driving detection patterns and pairs of adjacent sensing detection patterns, and may calculate the location of the detected touch input as touch input coordinates. The unit sensing areas SUT may detect touch input in a mutual capacitance manner, but the present disclosure is not limited thereto.

The unit sensing areas SUT may be greater in size than the pixels. For example, a single sensing unit area SUT may correspond to multiple pixels. The unit sensing areas SUT may have a length of 4 mm to 5 mm, but the present disclosure is not limited thereto.

Dummy electrodes DE may be disposed between the first touch detection electrodes IE1 and the second touch detection electrodes IE2. The dummy electrodes DE may be formed during the formation of the first touch detection electrodes IE1 and the second touch detection electrodes IE2. The first touch detection electrodes IE1 and the second touch detection electrodes IE2 may be formed by being separated from a single electrode. For example, a conductive electrode may be etched into the first touch detection electrodes IE1 and the second touch detection electrodes IE2. During the etching of the conductive electrode, the dummy electrodes DE may be formed between the first touch detection electrodes IE1 and the second touch detection electrodes IE2 to control the area of the driving detection patterns of each of the first touch detection electrodes IE1 and the area of the sensing detection patterns of each of the second touch detection electrodes IE2. The first touch detection electrodes IE1, the second touch detection electrodes IE2, and the dummy electrodes DE2 may be physically isolated from one another via etching, and the aforementioned gaps may exist between first touch detection electrodes IE1, the second touch detection electrodes IE2, and the dummy electrodes DE2. In other exemplary embodiments of the present disclosure, the dummy electrodes DE may be omitted.

The touch member includes the signal wiring unit (TX, RX, ES, and GL), which is disposed in the non-display area NDA. The signal wiring unit (TX, RX, ES, and GL) may include touch driving wires (TX1_1 through TX5_1 and TX1_2 and TX5_2), touch sensing wires (RX1_1 through RX8_1 and RX1_2), guard wires (GL1 through GL5), and antistatic wires (ES1 and ES2). The touch driving wires (TX1_1 through TX5_1 and TX1_2 and TX5_2), the touch sensing wires (RX1_1 through RX8_1 and RX1_2), the guard wires (GL1 through GL5), and the antistatic wires (ES1 and ES2) may extend from the pad terminal unit TPA to the non-display area NDA, and the touch driving wires (TX1_1 through TX5_1 and TX1_2 and TX5_2) and the touch sensing wires (RX1_1 through RX8_1 and RX1_2) may be connected to the first touch detection electrodes IE1 and the second touch detection electrodes IE2.

Driving signals may be transmitted to the first touch detection electrodes IE1 via the touch driving wires (TX1_1 through TX5_1 and TX1_2 and TX5_2), and sensing signals may be transmitted to the second touch detection electrodes IE2 via the touch sensing wires (RX1_1 through RX8_1 and RX1_2).

The touch driving wires (TX1_1 through TX5_1 and TX1_2 and TX5_2) may be connected to the first touch detection electrodes IE1. In one exemplary embodiment of the present disclosure, multiple touch driving wires may be connected to a single first touch detection electrode IE1. For example, the touch driving wires (TX1_1 through TX5_1 and TX1_2 and TX5_2) may include first touch driving wires TX1_1 through TX5_1 connected to lower ends of the first touch detection electrodes IE1 and second touch driving wires TX1_2 through TX5_2 connected to upper ends of the first touch detection electrodes IE1.

In one exemplary embodiment of the present disclosure, the first touch driving wires TX1_1 through TX5_1 may extend from the pad terminal unit TPA toward the first side and/or the second side in the second direction dr2 to be connected to the lower ends of the first touch detection electrodes IE1.

In one exemplary embodiment of the present disclosure, the second touch driving wires TX1_2 through TX5_2 may extend from the pad terminal unit TPA toward the first side in the second direction dr2, may bypass the left edge of the display area DA, and may bypass the upper edge of the display area DA, including protruding parts, to be connected to the upper ends of the first touch detection electrodes IE1.

In one exemplary embodiment of the present disclosure, at least some of the second touch driving wires TX1_2 through TX5_2 may bypass the area where the speaker module MD1, the camera module MD2, and the sensor module MD3 are disposed when bypassing the upper edge of the display area DA. For example, the second touch driving wires TX1_2 through TX5_2, which are connected to the first through fifth driving electrodes TE1 through TE5, may extend generally in the second direction dr2 when bypassing the upper edge of the display are DA, but may include parts extending in the first direction dr1 to bypass the area where the speaker module MD1, the camera module MD2, and the sensor module MD3 are disposed.

The second touch driving wires TX2_2 through TX4_2, which are connected to the second through fourth driving electrodes TE2 through TE4, may include parts disposed between the eighth and ninth sensing electrodes RE8 and RE9. For example, the second touch driving wires TX2_2 through TX4_2, which are connected to the second through fourth driving electrodes TE2 through TE4, may pass through the central area CA. The second touch driving so wires TX2_2 through TX4_2, which are connected to the second through fourth driving electrodes TE2 through TE4, may include parts overlapping with the eighth and ninth sensing electrodes RE8 and RE9 in the second direction dr2.

The touch sensing wires (RX1_1 through RX8_1 and RX1_2) are connected to the second touch detection electrodes IE2. In one exemplary embodiment of the present disclosure, each of the first through ninth sensing electrodes RE1 through RE9, unlike the first through fifth driving electrodes TE1 through TE5, may be connected to one of the touch sensing wires (RX1_1 through RX8_1 and RX1_2) at only one end thereof.

The touch sensing wires (RX1_1 through RX8_1 and RX1_2) might not be connected to sensing detection patterns of the eighth and ninth sensing electrodes RE8 and RE9 that are opposite to each other, e.g., the second sensing detection pattern RE82 of the eighth sensing electrode RE8 and the first sensing detection pattern RE91 of the ninth sensing electrode RE9. Also, no wires may be provided so as to connect the eighth and ninth sensing electrodes RE8 and RE9.

Also, the touch sensing wires (RX1_1 through RX8_1 and RX1_2) might not be disposed in the central area CA. Thus, there may be no wires in the central area CA that are connected to the eighth and ninth sensing electrodes RE8 and RE9.

Touch sensing wires RX1_1 through RX8_1, which are connected to the first through seventh sensing electrodes RE1 through RE7 and the ninth sensing electrode RE9, may extend from the pad terminal unit TPA at a lower side of the non-display area NDA toward the second side in the second direction dr2 and may then extend in the first direction dr1 on the outside of the right edge of the display area DA, and may thus be connected to right ends of the first through seventh sensing electrodes RE1 through RE7 and the ninth sensing electrode RE9, e.g., the sixth sensing detection patterns RE16 through RE76 of the first through seventh sensing electrodes RE1 through RE7, and the second sensing detection pattern RE92 of the ninth sensing so electrode RE9. For example, the touch sensing wires RX2_1 through RX8_1 may be respectively connected only to the ends of the sixth sensing detection patterns RE16 through RE76 of the first through seventh sensing electrodes RE1 through RE7, and the touch sensing wire RX9_1 may be connected only to the end of the second sensing detection pattern RE92 of the ninth sensing electrode RE9.

A touch sensing wire RX1_2, which is connected to the eighth sensing electrode RE8, may extend from the pad terminal unit TPA at the lower side of the non-display area NDA toward the first side in the second direction dr2 and may then extend in the first direction dr1 on the outside of the left edge of the display area DA, and may thus be connected to a left end of the eight sensing electrode RE8, e.g., the first sensing detection pattern RE81 of the eighth sensing electrode RE8. For example, the touch sensing wire RX1_2 may be connected to only the end of the first sensing detection pattern RE81 of the eighth sensing electrode RE8. In a case where the touch sensing wire RX1_2 extends on the outside of the left edge of the display area DA, the touch sensing wire RX1_2 may extend on the inside of the second touch driving wires TX1_2 through TX5_2.

As described above, in the case of arranging the touch sensing wires RX1_2 and RX1_1 to be connected to the eighth and ninth sensing electrodes RE8 and RE9, respectively, the touch sensing wires (RX1_1 through RX8_1 and RX1_2) can be prevented from overlapping with, or intersecting, the touch driving wires (TX1_1 through TX5_1 and TX1_2 through TX5_2). Accordingly, the touch driving wires (TX1_1 through TX5_1 and TX1_2 through TX5_2) and the touch sensing wires (RX1_1 through RX8_1 and RX1_2) can be prevented from being short-circuited.

Also, the linewidth of the touch driving wires (TX1_1 through TX5_I and TX1_2 through TX5_2) can be easily controlled. If the linewidth of the touch driving wires (TX1_1 through TX5_1 and TX1_2 through TX5_2) is increased, the recognition performance of the organic light-emitting display device 1 may be increased. On the other hand, if the linewidth of the touch driving wires (TX1_1 through TX5_1 and TX1_2 through TX5_2) is reduced, the touch dead space of the organic light-emitting display device 1 may be reduced.

In one exemplary embodiment of the present disclosure, two touch driving wires may be connected to each of the first touch detection electrodes IE1, whereas one touch sensing wire is connected to each of the second touch detection electrodes IE2.

A driving voltage signal provided to the first touch detection electrodes IE2 may have a higher voltage than a driving voltage signal provided to the second touch detection electrodes IE2. In a case where a driving voltage signal having a relatively high voltage is provided to the first touch detection electrodes IE1, the voltage in each of the first touch detection electrodes IE1 may considerably vary from one location to another location depending on the distance to the wire to which each of the first touch detection electrodes IE1 is connected. For example, if only the first touch driving wires TX1_1 through TX5_1 are provided so as to be connected only to one end of each of the first touch detection electrodes IE1, the voltage in the first driving detection patterns of the first touch detection electrodes IE1, e.g., the first driving detection patterns TE11 and TE21, may considerably differ from the voltage in the eighth or ninth driving detection patterns of the first touch detection electrodes IE1, e.g., the ninth and eighth driving detection patterns TE19 and TE28. By connecting multiple touch driving wires to each of the first touch detection electrodes IE1, differences between the voltages of the detection patterns of each of the first touch detection electrodes IE1 can be minimized.

The antistatic wires (ES1 and ES2) may be disposed on the outside of the touch driving wires (TX1_1 through TX5_1 and TX1_2 through TX5_2) and the touch sensing wires (RX1_1 through RX8_1 and RX1_2). In one exemplary embodiment of the present disclosure, the antistatic wires (ES1 and ES2) may include first and second antistatic wires ES1 and ES2. The so first and second antistatic wires ES1 and ES2 may surround the touch driving wires (TX1_1 through TX5_1 and TX1_2 through TX5_2) and the touch sensing wires (RX1_1 through RX8_1 and RX1_2) in a ring-like manner. The first and second antistatic wires ES1 and ES2 might not be connected to each other.

The first antistatic wire ES1 may cover the wires disposed on the right side and a part of the lower side of the display area DA.

The second antistatic wire ES2 may cover the wires disposed on the left side, the upper side, and the other part of the lower side of the display area DA and the wires disposed on the other part of the lower side of the display area DA.

The antistatic wires (ES1 and ES2) may be wires where a first reference voltage signal flows. The antistatic wires (ES1 and ES2) may alleviate electrostatic shock that may be applied from the outside to the touch driving wires (TX1_1 through TX5_1 and TX1_2 through TX5_2), the touch sensing wires (RX1_1 through RX8_1 and RX1_2), and the detection electrode unit (IE1 and IE2).

The guard wires (GL1 through GL5) are disposed between the touch driving wires (TX1_1 through TX5_1 and TX1_2 through TX5_2) and the touch sensing wires (RX1_1 through RX8_1 and RX1_2) and/or between the touch driving wires (TX1_1 through TX5_1 and TX1_2 through. TX5_2), the touch sensing wires (RX1_1 through RX8_1 and RX1_2), and the antistatic wires (ES1 and ES2). The guard wires (GL1 through GL5) may include first through fifth guard wires GL1 through GL5.

The first guard wire GL1 may be disposed between the touch sensing wires RX1_1 through RX8_1 and the first antistatic wire ES1, which all extend on the right side of the non-display area NDA.

The second guard wire GL2 may be disposed between the first touch driving wires TX1_1 through TX5_1, which are connected to the lower ends of the first touch detection electrodes IE1, and the touch sensing wires RX1_1 through RX8_1, which extend on the right side of the non-display area NDA.

The third guard wire GL3 may be disposed between the first touch driving wires TX1_1 through TX5_1, which are connected to the lower ends of the first touch detection electrodes IE1, and the touch sensing wire RX1_2, which extends on the left side of the non-display area NDA.

The fourth guard wire GL4 may be disposed between the touch sensing wire RX1_2, which extends on the left side of the non-display area NDA, and the second touch driving wires TX1_2 through TX5_2, which are connected to the upper ends of the first touch detection electrodes IE1.

The fifth guard wire GL5 may be disposed between the second touch driving wires TX1_2 through TX5_2, which are connected to the upper ends of the first touch detection electrodes IE1, and the second antistatic wire ES2.

The guard wires (GL1 through GL5) may be wires where a second reference voltage signal flows. The guard wires (GL1 through GL5) may prevent signal interference between each pair of adjacent wires.

In one exemplary embodiment of the present disclosure, the pad terminal unit TPA may be disposed on the lower right side of the non-display area NDA. The location of the pad terminal unit TPA is not particularly limited and may vary depending on how the pad terminal unit TPA is electrically coupled to the touch member and other elements. The pad terminal unit TPA may include pad terminals connected to the touch driving wires (TX1_1 through TX5_1 and TX1_2 through TX5_2), the touch sensing wires (RX1_1 through RX8_1 and RX1_2), the guard wires (GL1 through GL5), and the antistatic wires (ES1 and ES2).

The stack structure of the touch member and how the touch member is coupled to the other elements of the organic light-emitting display device 1 will hereinafter be described.

Figure 7:
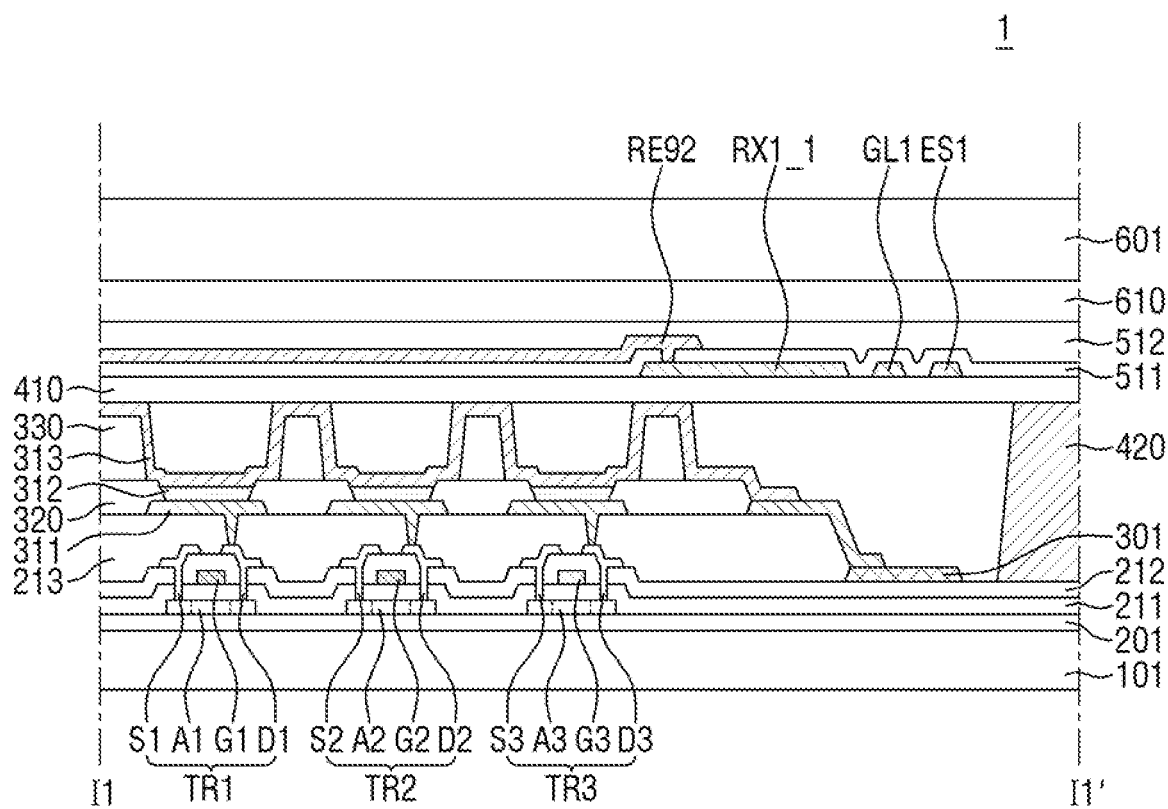
FIG. 7 is a cross-sectional view, taken along line I1-I1' of FIG. 3, of the organic light-emitting display device of FIG. 1.
Figure 8:
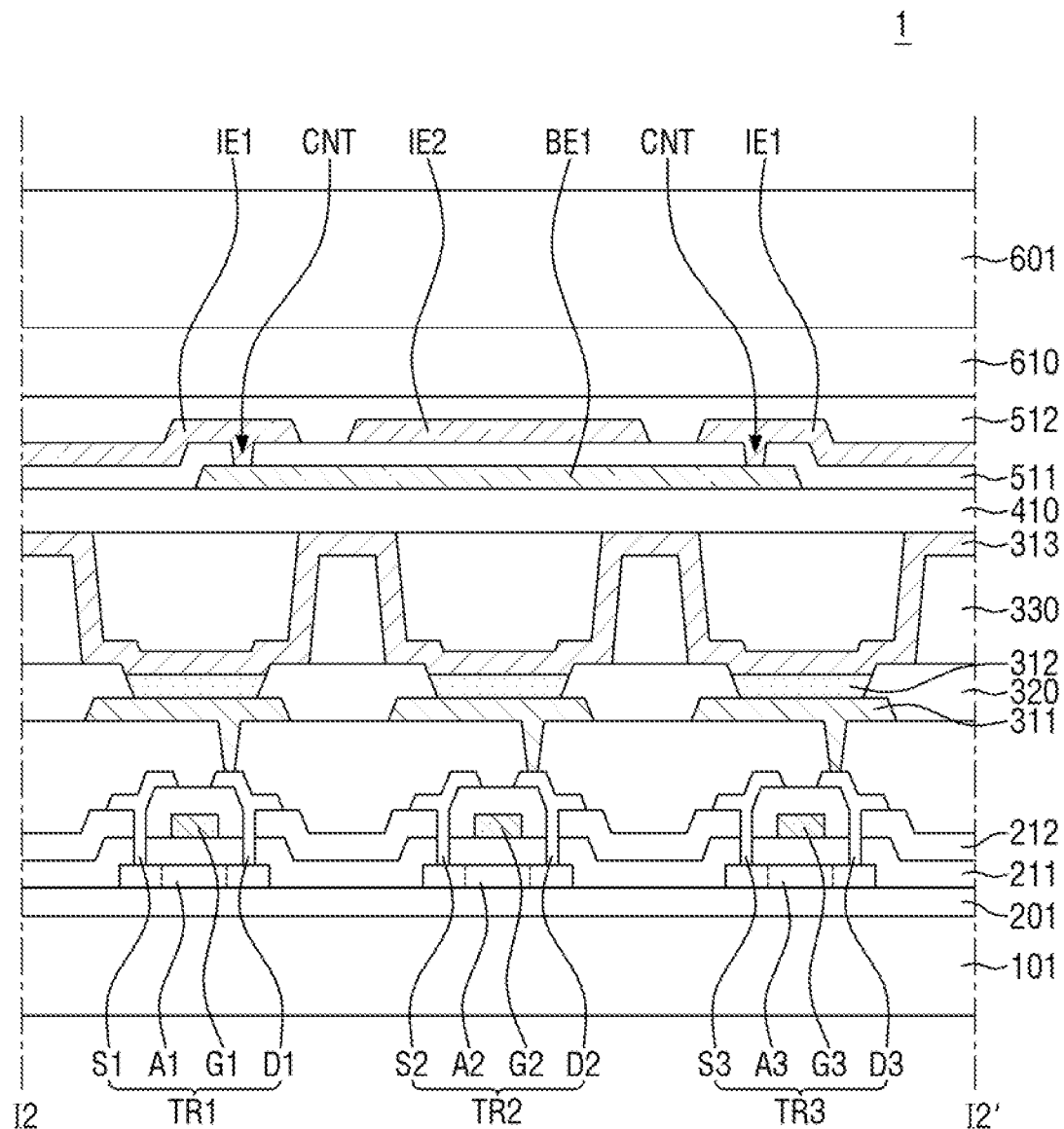
FIG. 8 is a cross-sectional view, taken along line I2-I2' of FIG. 6, of the organic light-emitting display device of FIG. 1.

FIG. 7 is a cross-sectional view, taken along line I1-I1' of FIG. 3, of the organic light-emitting display device of FIG. 1. FIG. 8 is a cross-sectional view, taken along line I2-I2' of FIG. 6, of the organic light-emitting display device of FIG. 1.

Referring to FIGS. 7 and 8, the touch layer 50 including the touch member may include the encapsulation layer 40, particularly, a first touch conductive layer, the first touch insulating layer 511, a second touch conductive layer, and a second touch insulating layer 512 sequentially disposed on an encapsulation substrate 410 that will be described later.

The first touch conductive layer is disposed on the encapsulation layer 40. The first touch conductive layer may include molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and/or copper (Cu). The first touch conductive layer may be a single- or multilayer film.

The first touch conductive layer may include the bridge electrodes (BE1 and BE2), the touch driving wires (TX1_1 through TX5_1 and TX1_2 through TX5_2), the touch sensing wires (RX1_1 through RX8_1 and RX1_2), the guard wires (GL1 through GL5), and the antistatic wires (ES1 and ES2). For example, the first touch conductive layer may be disposed in the same layer as the bridge electrodes (BE1 and BE2), the touch driving wires (TX1_1 through TX5_1 and TX1_2 through TX5_2), the touch sensing wires (RX1_1 through RX8_1 and RX1_2), the guard wires (GL1 through GL5), and the antistatic wires (ES1 and ES2) and may include the same material as the bridge electrodes (BE1 and BE2), the touch driving wires (TX1_1 through TX5_1 and TX1_2 through TX5_2), the touch sensing wires (RX1_1 through RX8_1 and RX1_2), the guard wires (GL1 through GL5), and the antistatic wires (ES1 and ES2).

The first touch insulating layer 511 is disposed on the first touch conductive layer. As mentioned above, the first touch insulating layer 511 may include the contact holes CNT, which partially expose the bridge electrodes (BE1 and BE2). The first touch insulating layer 511 may further include contact holes CNT, which partially expose the touch driving wires (TX1_1 through TX5_1 and TX1_2 through TX5_2) and the touch sensing wires (RX1_1 through RX8_1 and RX1_2).

In one exemplary embodiment of the present disclosure, the first touch insulating layer 511 may be disposed on the entire surface of the substrate 10, but the present disclosure is not limited thereto. The first touch insulating layer 511 may include silicon oxide (SiOx), silicon nitride (SiNx), silicon oxynitride, aluminum oxide, tantalum oxide, hafnium oxide, zirconium oxide, or titanium oxide, and these materials may be used alone or in combination. The first touch insulating layer 511 may be a single-layer film or a multilayer film consisting of a stack of different materials.

The second touch conductive layer is disposed on the first touch insulating layer 511. The second touch conductive layer may include a transparent conductive oxide such as indium tin oxide (ITO), indium zinc oxide (IZO), zinc oxide (ZnO), or indium tin zinc oxide (ITZO).

The second touch conductive layer may include the first touch detection electrodes IE1 and the second touch detection electrodes IE2. For example, the detection patterns of the first touch detection electrodes and the detection patterns of the second touch detection electrodes IE2 may be disposed in the same layer and may include the same material. Also, the dummy electrodes DE may be disposed in the same layer as the first touch detection electrodes IE1 and the second touch detection electrodes IE2 and may include the same material as the first touch detection electrodes IE1 and the second touch detection electrodes IE2.

The first touch detection electrodes IE1 and the second touch detection electrodes may be connected to the touch driving wires (TX1_1 through TX5_1 and TX1_2 through TX5_2) and the touch sensing wires (RX1_1 through RX8_1 and RX1_2) via the contact hole CNT formed in the first touch insulating layer 511.

The second touch insulating layer 512 is disposed on the second touch conductive layer. The second touch insulating layer 512 may include the same material as the first touch insulating layer 511, but the present disclosure is not limited thereto. The second touch insulating layer 512 may be formed of the combination of at least one of the materials set forth above in connection with the first touch insulating layer 511. The second touch insulating layer 512 may be a single-layer film or a multilayer film consisting of a stack of different materials.

In one exemplary embodiment of the present disclosure, the second touch insulating layer 512 may be a planarization film planarizing the surface of the touch member. In an exemplary embodiment of the present disclosure, the touch member may further include a planarization film disposed on the second touch insulating layer 512 to planarize the surface of the touch member.

A base substrate 101 may be a rigid substrate. Here, the base substrate 101 may be a glass substrate, a quartz substrate, a glass ceramic substrate, or a crystalline glass substrate.

The display area DA, the non-display area NDA, the sensing area AA, and the non-sensing area NAA may be defined on the base substrate 101.

The base substrate 101 of FIGS. 7 and 8 may correspond to the substrate 10 of FIG. 2.

A buffer layer 201 is disposed on the base substrate 101. The buffer layer 201 planarizes the surface of the base substrate 101 and prevents the penetration of moisture or external air. The buffer layer 201 may be an inorganic film. The buffer layer 201 may be a single- or multilayer film.

A plurality of thin-film transistors (TFTs) (TR1, TR2, and TR3) are disposed on the buffer layer 201. The TFTs (TR1, TR2, and TR3) may be driving TFTs. The TFTs (TR1, TR2, and TR3) may include first, second, and third TFTs TR1, TR2, and TR3. One or more TFTs may be provided in each of the pixels. For example, the first TFT TR1 may be provided in a first pixel, the second TFT TR2 may be provided in a second pixel, and the third TFT TR3 may be provided in a third pixel. In one exemplary embodiment of the present disclosure, the first, second, and third pixels may be red, green, and blue pixels, respectively, but the present disclosure is not limited thereto. In an exemplary embodiment of the present disclosure, the first, second, and third pixels may be cyan, magenta, and yellow pixels, respectively.

The first, second, and third TFTs TR1, TR2, and TR3 may include semiconductor layers A1, A2, and A3, respectively, gate electrodes G1, G2, and G3, respectively, source electrodes S1, S2, and S3, respectively, and drain electrodes D1, D2, and D3, respectively. For example, the semiconductor layers A1, A2, and A3 are disposed on the buffer layer 201. The semiconductor layers A1, A2, and A3 may include amorphous silicon, polysilicon, low-temperature polysilicon, or an organic semiconductor. In an exemplary embodiment of the present disclosure, the semiconductor layers A1, A2, and A3 may include an oxide semiconductor. Each of the semiconductor layers A1, A2, and A3 may include a channel region and source and drain regions disposed on both sides of the channel region and doped with impurities.

A gate insulating film 211 is disposed on the semiconductor layers A1, A2, and A3. The gate insulating film 211 may be an inorganic film. The gate insulating film 211 may be a single- or multilayer film.

The gate electrodes G1, G2, and G3 are disposed on the gate insulating film 211. The gate electrodes G1, G2, and G3 may be formed of a conductive metal material. For example, the gate electrodes G1, G2, and G3 may include Mo, Al, Cu, or Ti. As used herein, the phrase "conductive metal material" is understood to be any metal material having an electric conductivity in a range of the aforementioned metals. The gate electrodes G1, G2, and G3 may be single- or multilayer films.

An interlayer insulating film 212 is disposed on the gate electrodes G1, G2, and G3. The interlayer insulating film 212 may be an inorganic film. The interlayer insulating film 212 may be a single- or multilayer film.

The source electrodes S1, S2, and S3 and the drain electrodes D1, D2, and D3 are disposed on the interlayer insulating film 212. The source electrodes S1, S2, and S3 and the drain electrodes D1, D2, and D3 are formed of a conductive metal material. For example, the source electrodes S1, S2, and S3 and the drain electrodes D1, D2, and D3 may include Al, Cu, Ti, or Mo.

The source electrodes S1, S2, and S3 and the drain electrodes D1, D2, and D3 may be electrically connected to the source regions and the drain regions, respectively, of the semiconductor layers A1, A2, and A3 via contact holes that penetrate the interlayer insulating film 212 and the gate insulating film 211.

The organic light-emitting display device 1 may further include storage capacitors and switching TFTs disposed on the base substrate 101.

A protective layer 213 is disposed on the source electrodes S1, S2, and S3, the drain electrodes D1, D2, and D3, and the interlayer insulating film 212. Here, the protective layer 213 covers a pixel circuit unit including the TFTs (TR1, TR2, and TR3). The protective layer 213 may be a passivation film or a planarization film. The passivation film may include $SiO_2$ or SiNx, and the planarization film may include acryl or polyimide (PI). The protective layer 213 may include both the passivation film and the planarization film, in which case, the passivation film may be disposed on the source electrodes S1, S2, and S3, the drain electrodes D1, D2, and D3, and the interlayer insulating film 212 and the planarization film may be disposed on the passivation film. The top surface of the protective layer 213 may be flat.

The buffer layer 201, the gate insulating film 211, the interlayer insulating film 212, and the protective layer 213 of FIGS. 7 and 8 may correspond to the circuit layer 20 of FIG. 2.

A plurality of first pixel electrodes 311 are disposed on the protective layer 213. The first pixel electrodes 311 may be pixel electrodes disposed in the pixels. Also, the first pixel electrodes 311 may be the anode electrodes of organic light-emitting diodes (OLEDs).

The first pixel electrodes 311 may be electrically connected to the drain electrodes D1, D2, and D3 (or the source electrodes S1, S2, and S3), which are disposed on the base substrate 101, via via holes that penetrate the protective layer 213.

The first pixel electrodes 311 may include a material with a high work function. The first pixel electrodes 311 may include indium tin oxide (ITO), indium zinc oxide (IZO), zinc oxide (ZnO), or indium oxide ($In_2O_3$). As used herein, the phrase "material with a high work function" is understood to be at least any material having a work function within the range of the aforementioned examples.

A pixel defining film 320 is disposed on the first pixel electrodes 311. The pixel defining film 320 includes openings at least partially exposing the first pixel electrodes 311. The pixel defining film 320 may include an organic material or an inorganic material. In one exemplary embodiment of the present disclosure, the pixel defining film 320 may include photoresist, a PI resin, an acrylic resin, a silicon compound, or a polyacrylic resin.

An organic light-emitting layer 312 is disposed on the first pixel electrodes 311, which are exposed by the pixel defining film 320.

A second common electrode 313 is disposed on the organic light-emitting layer 312. The second common electrode 313 may be a common electrode disposed without a distinction between the pixels. The second pixel electrode 313 may be the cathode electrodes of OLEDs.

The second pixel electrode 313 may include a material with a low work function. The second pixel electrode 313 may include Li, Ca, LiF/Ca, LiF/Al, Al, Mg, Ag, Pt, Pd, Ni, Au Nd, Ir, Cr, BaF, Ba, or a compound or mixture thereof (e.g., the mixture of Ag and Mg). As used herein, the phrase "material with a low work function" is understood to be at least any material having a work function within the range of the aforementioned examples. The second pixel electrode 313 may be connected to a power line 301.

The first pixel electrodes 311, the organic light-emitting layer 312, and the second pixel electrode 313 may form OLEDs.

The first pixel electrodes 311, the organic light-emitting layer 312, and the second pixel electrode 313 may correspond to the light-emitting layer 30 of FIG. 2.

The encapsulation substrate 410 is disposed on the second pixel electrode 313. The encapsulation substrate 410 is coupled to the base substrate 101 to face the base substrate 101 and protects OLEDs. A transparent insulating substrate formed of glass, quartz, ceramic, or plastic may be used as the encapsulation substrate 410. In other exemplary embodiments of the present disclosure, the encapsulation substrate 410 may be omitted, in which case, the flexibility of the organic light-emitting display device 1 may be increased.

In some exemplary embodiments of the present disclosure, spacers 330 are provided on the pixel defining film 320. The spacers 330 may be disposed between the base substrate 101 and the encapsulation substrate 410 to maintain the distance between the base substrate 101 and the encapsulation substrate 410. The spacers 330 may be provided so as to prevent the display properties of the organic light-emitting display device 1 from being degraded by external shock. The spacers 330 may protrude from the pixel defining film 320 toward the encapsulation substrate 410.

The encapsulation substrate 410 of FIGS. 7 and 8 may correspond to the encapsulation layer 40 of FIG. 2.

A sealing member 420 may be disposed along the edges of the organic light-emitting display device 1 and may surround the pixels between the base substrate 101 and the encapsulation substrate 410 and may thus seal the space between the base substrate 101 and the encapsulation substrate 410. In one exemplary embodiment of the present disclosure, the sealing member 420 may include an inorganic material. For example, the sealing member 420 may include glass frit and may be applied by a dispenser or a screen printing method. Glass frit generally refers to a powder-type glass raw material, but the present disclosure is not limited thereto. The term "glass frit", as used herein, may encompass a paste including $SiO_2$ as its main ingredient and further including a laser or infrared absorber, an organic binder, or a filler for lowering a thermal expansion coefficient. In response to a laser beam being applied to the sealing member 420, the sealing member 420 may melt and may be cured, and as a result, the base substrate 101 and the encapsulation substrate 410 may be bonded.

The touch member may be disposed on the encapsulation substrate 410. In one exemplary embodiment of the present disclosure, the touch driving wires (TX1_1 through TX5_1 and TX1_2 through TX5_2), the touch sensing wires (RX1_1 through RX8_1 and RX1_2), the guard wires (GL1 through GL5), and the antistatic wires (ES1 and ES2) may be disposed in the non-display area NDA to be located on the inside of the sealing member 420. The distance from the boundary between the non-display area NDA and the display area DA to the sealing member 420 may be about 2 mm or less.

A window member 601 may be disposed on the touch layer 50. The window member 601 may protect the light-emitting layer 30, the circuit layer 20, or the touch layer 50 against scratches. The window member 601 may be attached to the touch layer 50 via an adhesive member 610 such as an optically clear adhesive (OCA) or an optically clear resin (OCR).

The window member 601 of FIGS. 7 and 8, including the adhesive member 610, may correspond to the cover layer 60 of FIG. 2.

An optical member such as an antiglare film or a polarizer film may be provided on or below the window member 601.

Organic light-emitting display devices according to exemplary embodiments of the present disclosure will hereinafter be described, focusing mainly on differences with the organic light-emitting display device 1 of FIGS. 1 through 8. In FIGS. 1 through 21, like reference numerals may indicate like elements, and thus, to the extent that a detailed description of some elements is omitted, it may be assumed that these elements are at least similar to corresponding elements that have already been described.

Figure 9:
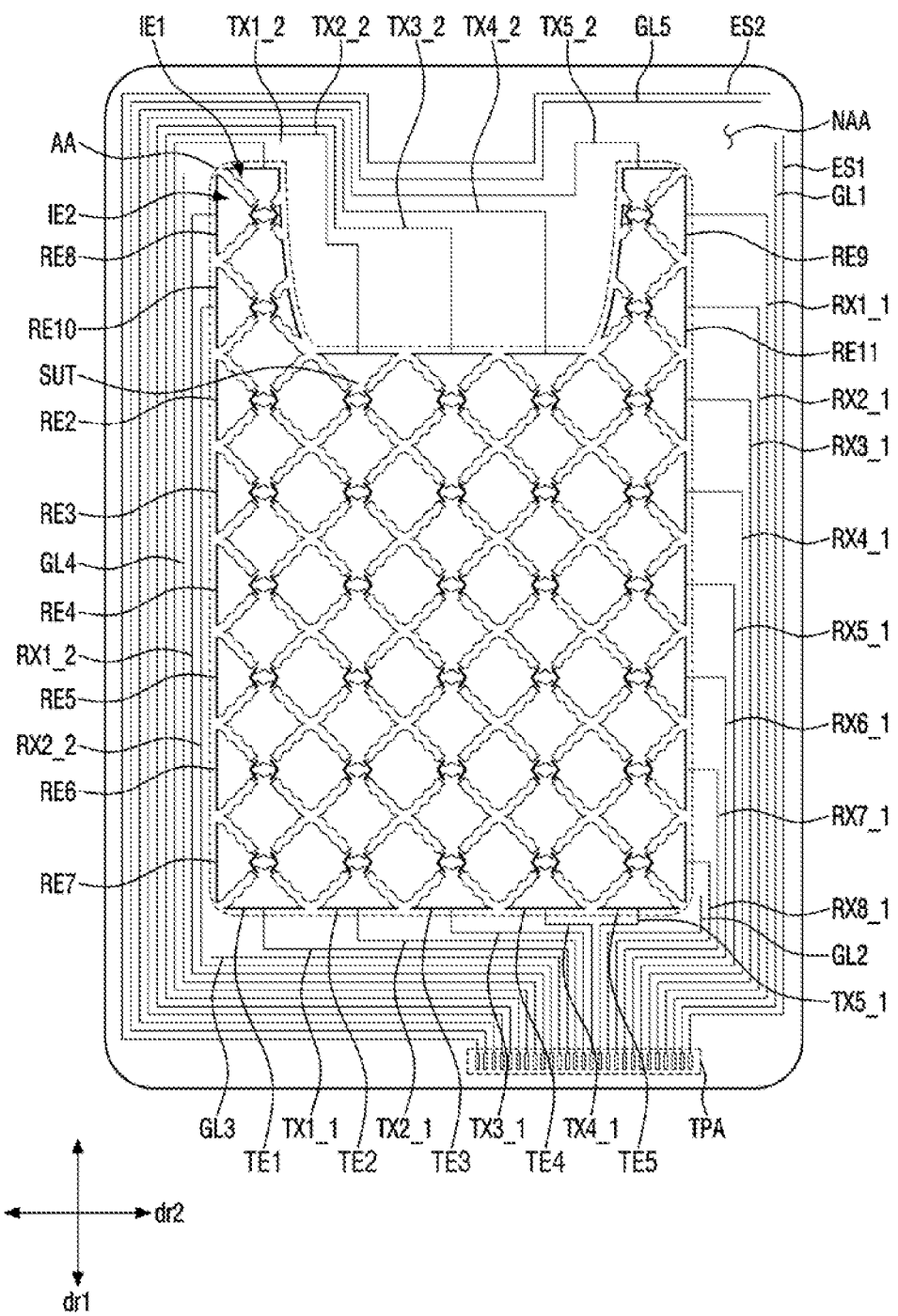
FIG. 9 is a layout view illustrating the layout of a touch sensing unit of an organic light-emitting display device according to another exemplary embodiment of the present disclosure.
Figure 10:
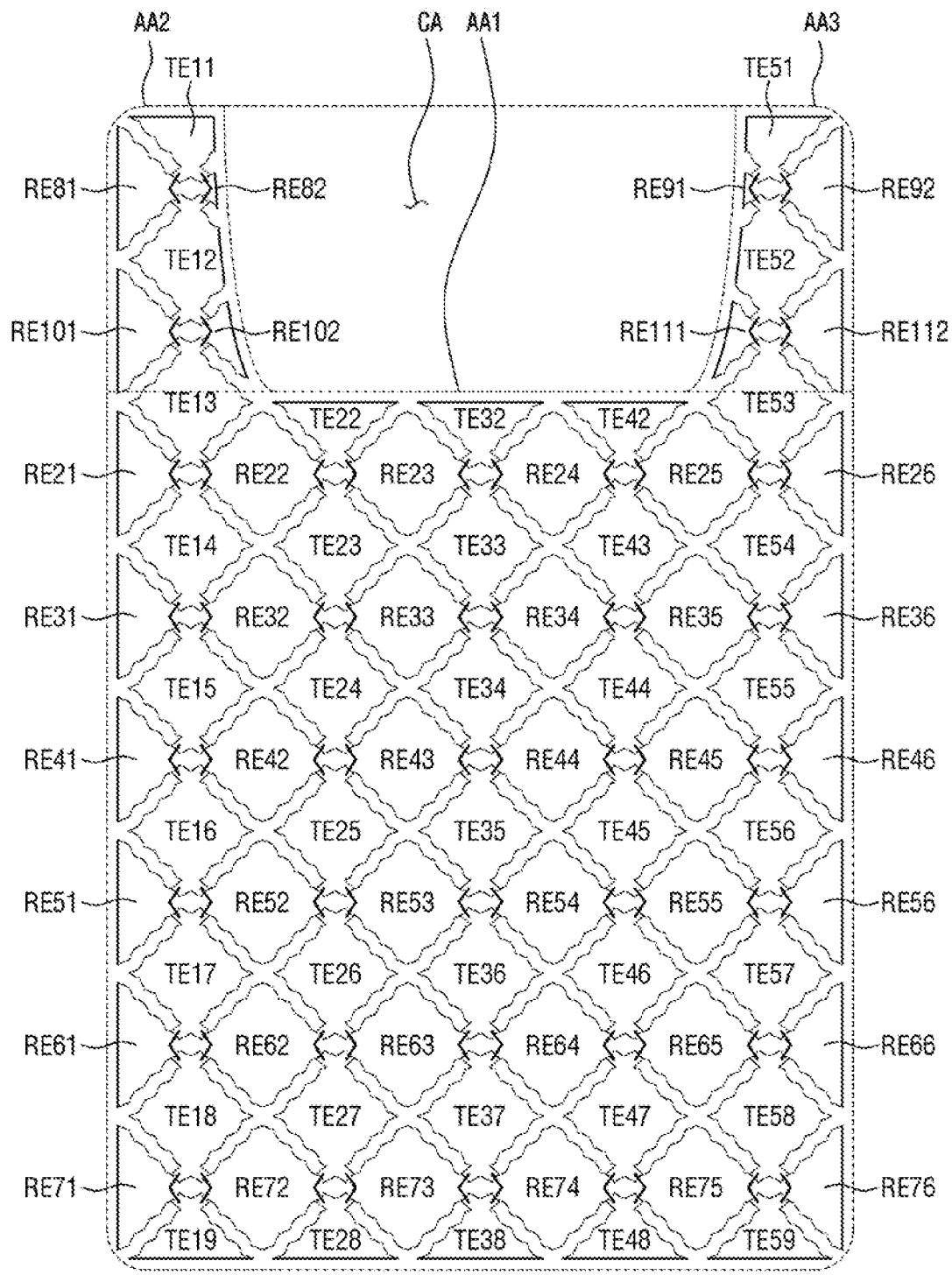
FIG. 10 is an enlarged layout view illustrating a detection electrode unit of FIG. 9.

FIG. 9 is a layout view illustrating the layout of a touch sensing unit of an organic light-emitting display device according to an exemplary embodiment of the present disclosure. FIG. 10 is an enlarged layout view illustrating a detection electrode unit of FIG. 9.

Referring to FIGS. 9 and 10, a touch sensing unit 50a_1 differs from the touch sensing unit 50a of FIG. 3 in that a first edge, in a first direction dr1, of a display area DA is further recessed toward the inside of the display area DA to divide the first sensing electrode RE1 of FIG. 3 into tenth and eleventh sensing electrodes RE10 and RE11.

A first sub-detection electrode unit IE2a may include second through seventh sensing electrodes RE2 through RE7. A second sub-detection electrode unit IE2b may include eighth through eleventh sensing electrodes RE8 through RE11. The eighth and ninth sensing electrodes RE8 and RE9 may at least partially overlap with each other in a second direction dr2, and the tenth and eleventh sensing electrodes RE10 and RE11 may at least partially overlap with each other in the second direction dr2.

The eighth and tenth sensing electrodes RE8 and RE10 may be disposed in a second sensing area AA2, and the ninth and eleventh sensing electrodes RE9 and RE11 may be disposed in a third sensing area AA3. In one exemplary embodiment of the present disclosure, the area of a second sensing detection pattern RE82 of the eighth sensing electrode RE8 and a first sensing detection pattern RE91 of the ninth sensing electrode RE9 may be greater than the area of a second sensing detection pattern RE102 of the tenth sensing electrode RE10 and a first sensing detection pattern RE111 of the eleventh sensing electrode RE11.

The tenth sensing electrode RE10 may be disposed between the eighth and second sensing electrodes RE8 and RE2 and may cross between second and third driving detection patterns TE12 and TE13 of a first driving electrode TE1. The tenth sensing electrode RE10 may include first and second sensing detection patterns RE101 and RE102, and a touch sensing wire RX2_2 may be connected to one end of the first sensing detection pattern RE101 of the tenth sensing electrode RE10.

The eleventh sensing electrode RE11 may be disposed between the ninth sensing electrode RE9 and the second sensing electrode RE2 and may cross between second and third driving detection patterns TE52 and TE53 of a fifth driving electrode TE5. The eleventh sensing electrode RE11 may include first and second sensing detection patterns RE111 and RE112, and a touch sensing wire RX2_1 may be connected to one end of the second sensing detection pattern RE112 of the eleventh sensing electrode RE11.

The eighth through eleventh sensing electrodes RE8 through RE11 might not be connected to one another. There may exist no wires connecting the eighth and ninth sensing electrodes RE8 and RE9, which overlap with each other in the second direction dr2, and there may also exist no wires connecting the tenth and eleventh sensing electrodes RE10 and RE11, which overlap with each other in the second direction dr2. Wires connected to the eighth through eleventh sensing electrodes RE8 through RE11 might not be disposed in a central area CA.

Second touch driving wires TX2_2 through TX4_2, which are connected to second through fourth driving electrodes TE2 through TE4, may include parts overlapping with the tenth and eleventh sensing electrodes RE10 and RE11 in the second direction dr2 between the tenth and eleventh sensing electrodes RE10 and RE11.

In one exemplary embodiment of the present disclosure, second touch driving wires TX1_2 through TX5_2 may surround the touch sensing wires RX1_2 and RX2_2, which are connected to the eighth and tenth sensing electrodes RE8 and RE10. A fourth guard wire GL4 may be disposed between the second touch driving wires TX1_2 through TX5_2 and the touch sensing wires RX1_2 and RX2_2, which are connected to the eighth and tenth sensing electrodes RE8 and RE10.

Figure 11:
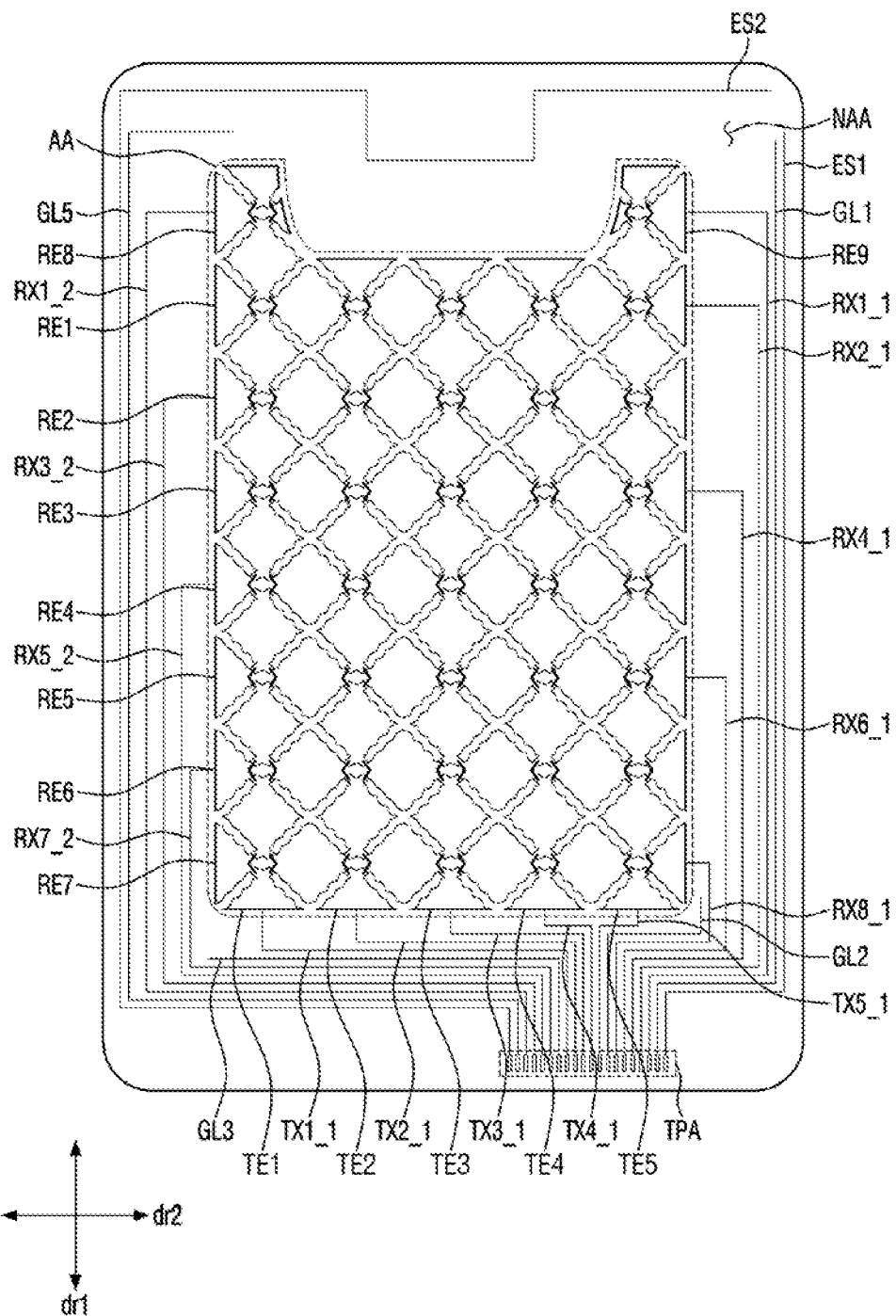
FIG. 11 is a layout view illustrating the layout of a touch sensing unit of an organic light-emitting display device according to an exemplary embodiment of the present disclosure.
Figure 12:
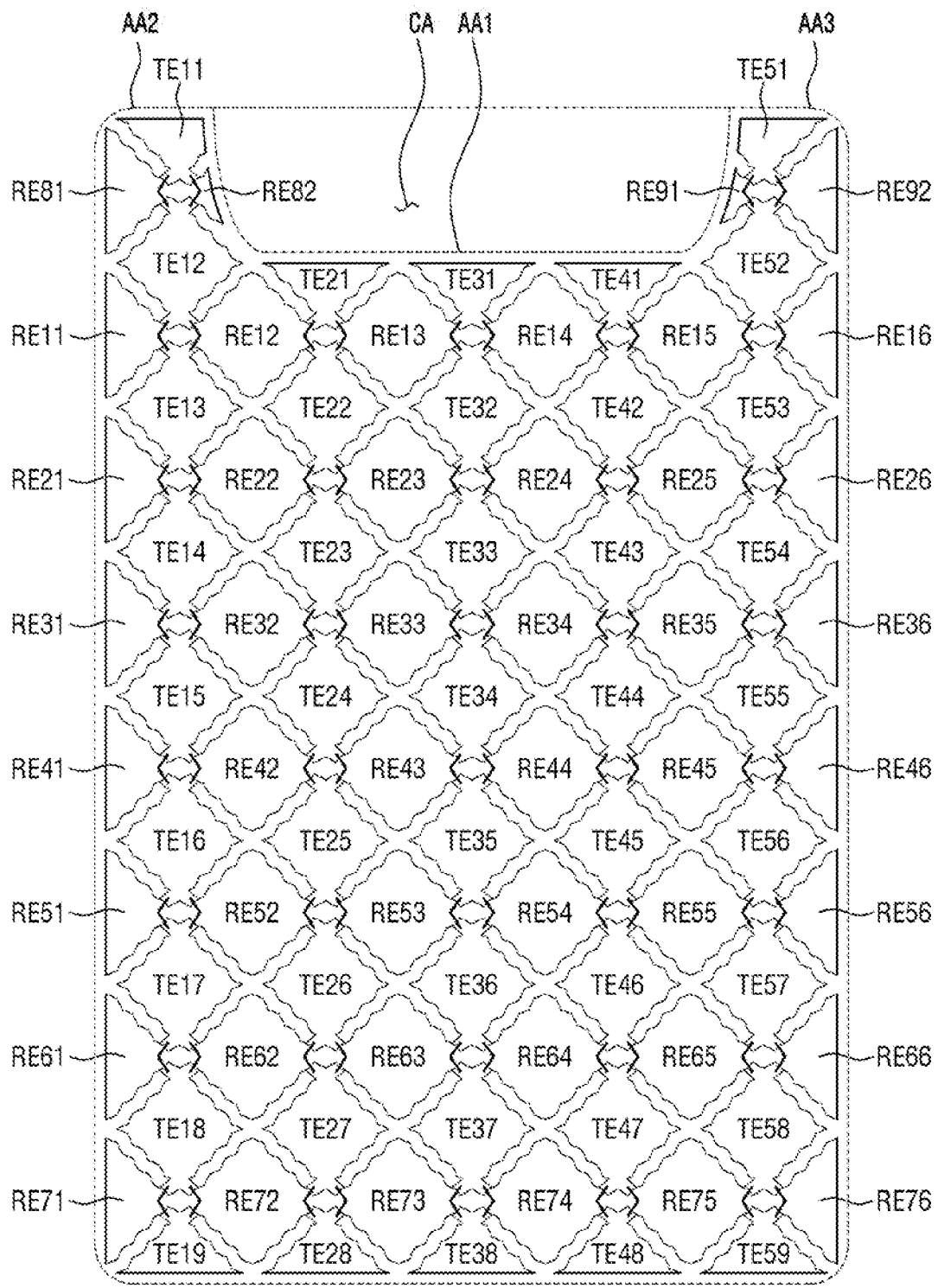
FIG. 12 is an enlarge layout view illustrating a detection electrode unit of FIG. 11.

FIG. 11 is a layout view illustrating the layout of a touch sensing unit of an organic light-emitting display device according to an exemplary embodiment of the present disclosure. FIG. 12 is an enlarge layout view illustrating a detection electrode unit of FIG. 11.

Referring to FIGS. 11 and 12, a touch sensing unit 50a_2 differs from the touch sensing unit 50a of FIG. 3 in that the second touch driving wires TX1_2 through TX5_2 of FIG. 3 are omitted.

A plurality of first touch detection electrodes IE1 may be connected to first touch driving wires TX1_1 through TX5_1 at only lower ends thereof. There may exist no touch driving wires (TX2_2 through TX4_2 of FIG. 3) between eighth and ninth sensing electrodes RE8 and RE9.

Touch sensing wires RX1_1, RX1_2, RX2_1, RX3_2, RX4_1, RX5_2, RX6_1, RX7_2, and RX8_1 may be divided almost equally between left and right sides of a non-sensing area NAA to be adjacent to left and right edges of the non-sensing area NAA. For example, the touch sensing wires RX1_1, RX1_2, RX2_1, RX3_2, RX4_1, RX5_2, RX6_1, RX7_2, and RX8_1 may be connected to a sixth sensing detection pattern RE16 of a first sensing electrode RE1, a first sensing detection pattern RE21 of a second sensing electrode RE2, a sixth sensing detection pattern RE36 of a third sensing electrode RE3, a first sensing detection pattern RE41 of a fourth sensing electrode RE4, a sixth sensing detection pattern RE56 of a fifth sensing electrode RE5, a first sensing detection pattern RE61 of a sixth sensing electrode RE6, a sixth sensing detection pattern RE76 of a seventh sensing electrode RE7, a first sensing detection pattern RE81 of the eighth sensing electrode RE8, and a second sensing detection pattern RE92 of the ninth sensing electrode RE9. Here, four touch sensing wires, e.g., the touch sensing wires RX1_2, RX3_2, RX5_2, and RX7_2, may be disposed adjacent to the left edge of the non-sensing area NAA, and five touch sensing wires, e.g., the touch sensing wires RX1_1, RX2_1, RX4_1, RX6_1, and RX8_1, may be disposed adjacent to the right edge of the non-sensing area NAA. However, the locations in the first through seventh sensing electrodes RE1 through RE7 where the touch sensing wires RX2_1, RX3_2, RX4_1, RX5_2, RX6_1, RX7_2, and RX8_1 are connected are not particularly limited, but may vary.

By adjusting the locations in the first through seventh sensing electrodes RE1 through RE7 where the touch sensing wires RX2_1, RX3_2, RX4_1, RX5_2, RX6_1, RX7_2, and RX8_1 are connected, the numbers of touch sensing wires extending on either side of a non-display area NDA can be controlled to be equal (or almost equal), and as a result, the thicknesses of the left and right sides of the non-display area NDA can be controlled to be equal.

Figure 13:
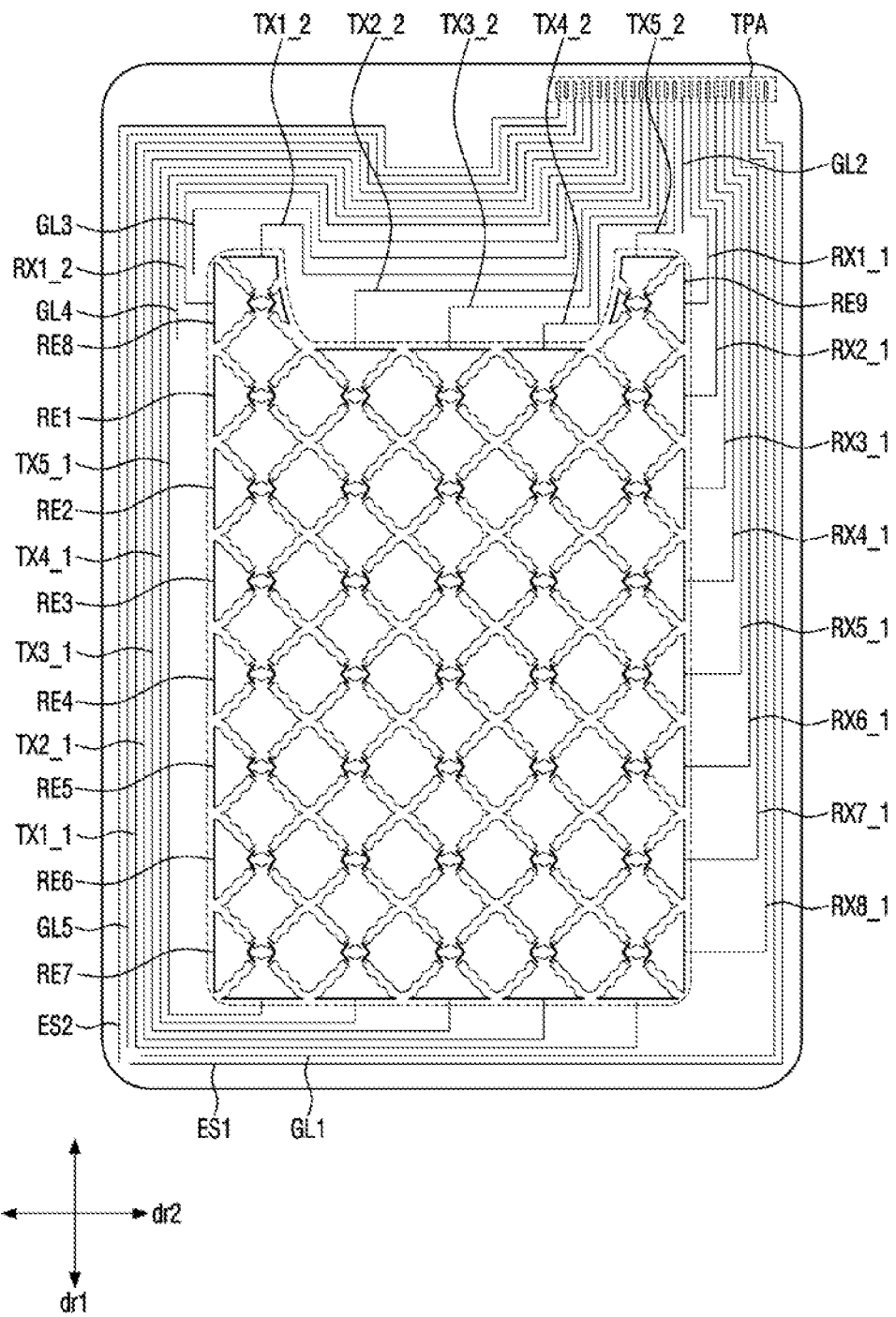
FIG. 13 is a layout view illustrating the layout of a touch sensing unit of an organic light-emitting display device according to an exemplary embodiment of the present disclosure.
Figure 14:
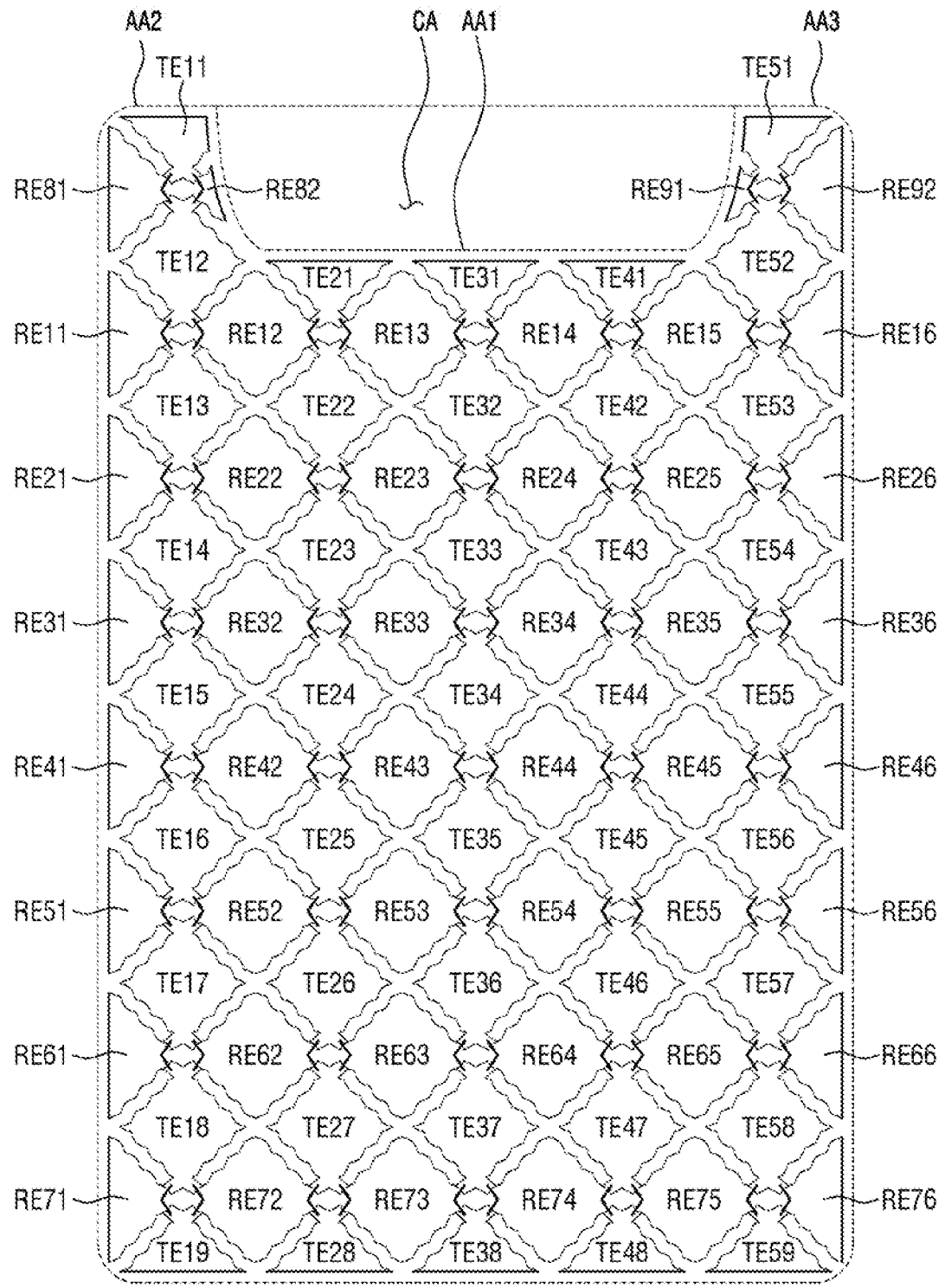
FIG. 14 is an enlarge layout view illustrating a detection electrode unit of FIG. 13.

FIG. 13 is a layout view illustrating the layout of a touch sensing unit of an organic light-emitting display device according to an exemplary embodiment of the present disclosure. FIG. 14 is an enlarge layout view illustrating a detection electrode unit of FIG. 13.

Referring to FIGS. 13 and 14, a touch sensing unit 50a_3 differs from the touch sensing unit 50a of FIG. 3 in that a pad terminal unit TPA is formed on an upper side of a non-display area NDA.

In one exemplary embodiment of the present disclosure, first touch driving wires TX1_1 through TX5_1 may extend from the pad terminal unit TPA toward a second side in a second direction dr2, may bypass a left edge of a display area DA, and may bypass an upper edge of the display area DA to be connected to upper ends of first touch detection electrodes IE1. At least some of the first touch driving wires TX1_1 through TX5_1 may bypass an irregular edge of the non-display area NDA when bypassing the upper edge of the display area DA. For example, the first touch driving wires TX1_1 through TX5_1, which are connected to first through fifth driving electrodes TE1 through TE5, may generally extend toward the second side in the second direction dr2 when bypassing the upper edge of the display area DA, but may include parts extending toward a first side in a first direction dr1 to bypass the irregular edge of the non-display area NDA.

Second touch driving wires TX1_2 through TX5_2 may extend from the pad terminal unit TPA toward a second side in the second direction dr2 to be connected to upper ends of the first touch detection electrodes IE1.

A first antistatic wire ES1 may cover the wires disposed on a right side and a part of a lower side of the display area DA.

A second antistatic wire ES2 may cover the wires disposed on a left side, an upper side, and the other part of the lower side of the display area DA.

A first guard wire GL1 may be disposed between touch sensing wires RX1_1 through RX8_1 and RX1_2 and the first antistatic wire ES1, which all extend on the right side of the non-display area NDA.

A second guard wire GL2 may be disposed between the second touch driving wires TX1_2 through TX5_2, which are connected to the upper ends of the first touch detection electrodes IE1, and the touch sensing wires RX1_1 through RX8_1, which extend on the right side of the non-display area NDA.

A third guard wire GL3 may be disposed between the second touch driving wires TX1_2 through TX5_2, which are connected to the upper ends of the first touch detection electrodes IE1, and the touch sensing wire RX1_2, which extends on the left side of the non-display area NDA.

A fourth guard wire GL4 may be disposed between the touch sensing wire RX1_2, which extends on the left side of the non-display area NDA, and the first touch driving wires TX1_1 through TX5_1, which are connected to the lower ends of the first touch detection electrodes IE1.

A fifth guard wire GL5 may be disposed between the first touch driving wires TX1_1 through TX5_1, which are connected to the lower ends of the first touch detection electrodes IE1, and the second antistatic wire ES2.

Figure 15:
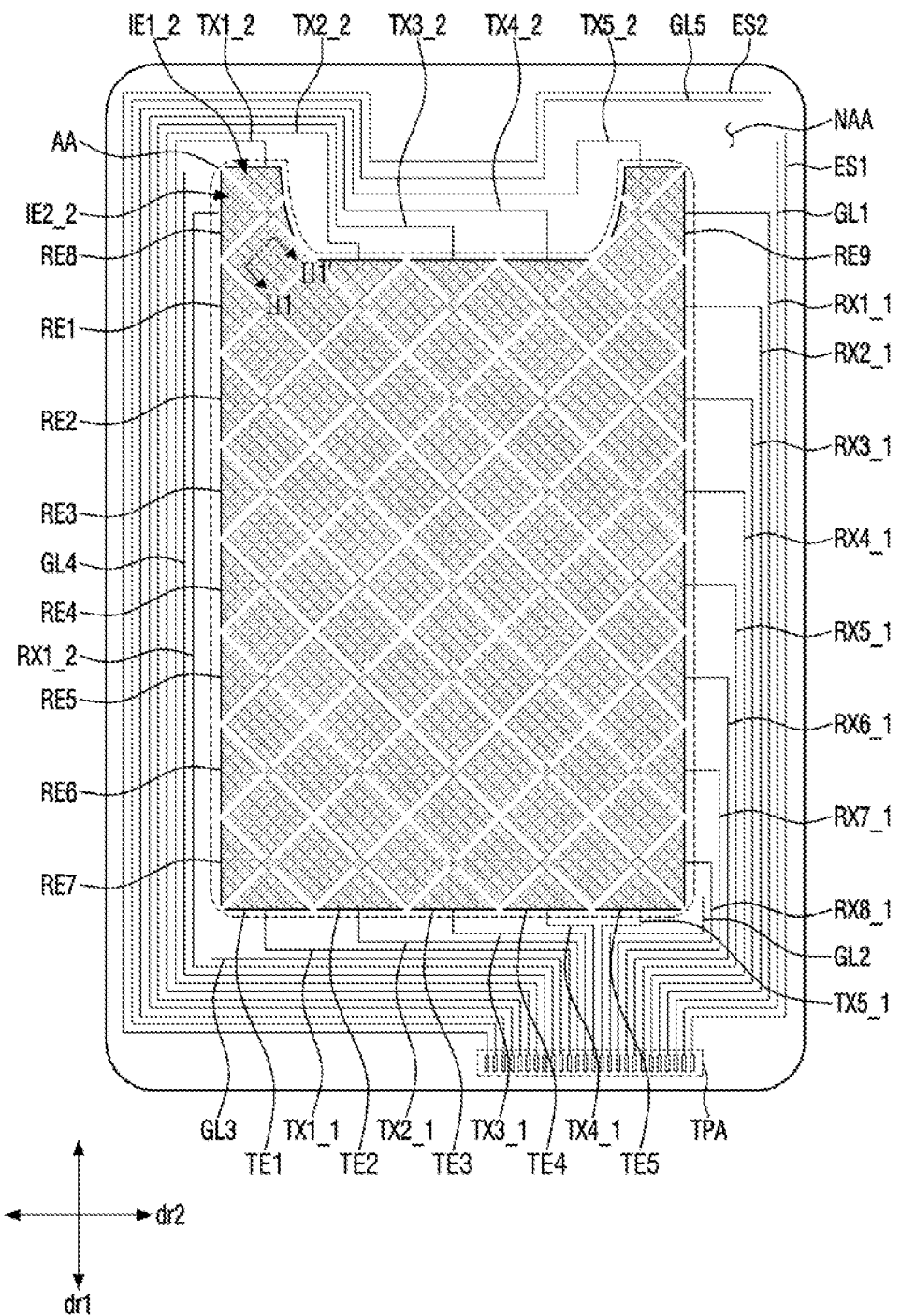
FIG. 15 is a layout view illustrating the layout of a touch sensing unit of an organic light-emitting display device according to an exemplary embodiment of the present disclosure.
Figure 16:
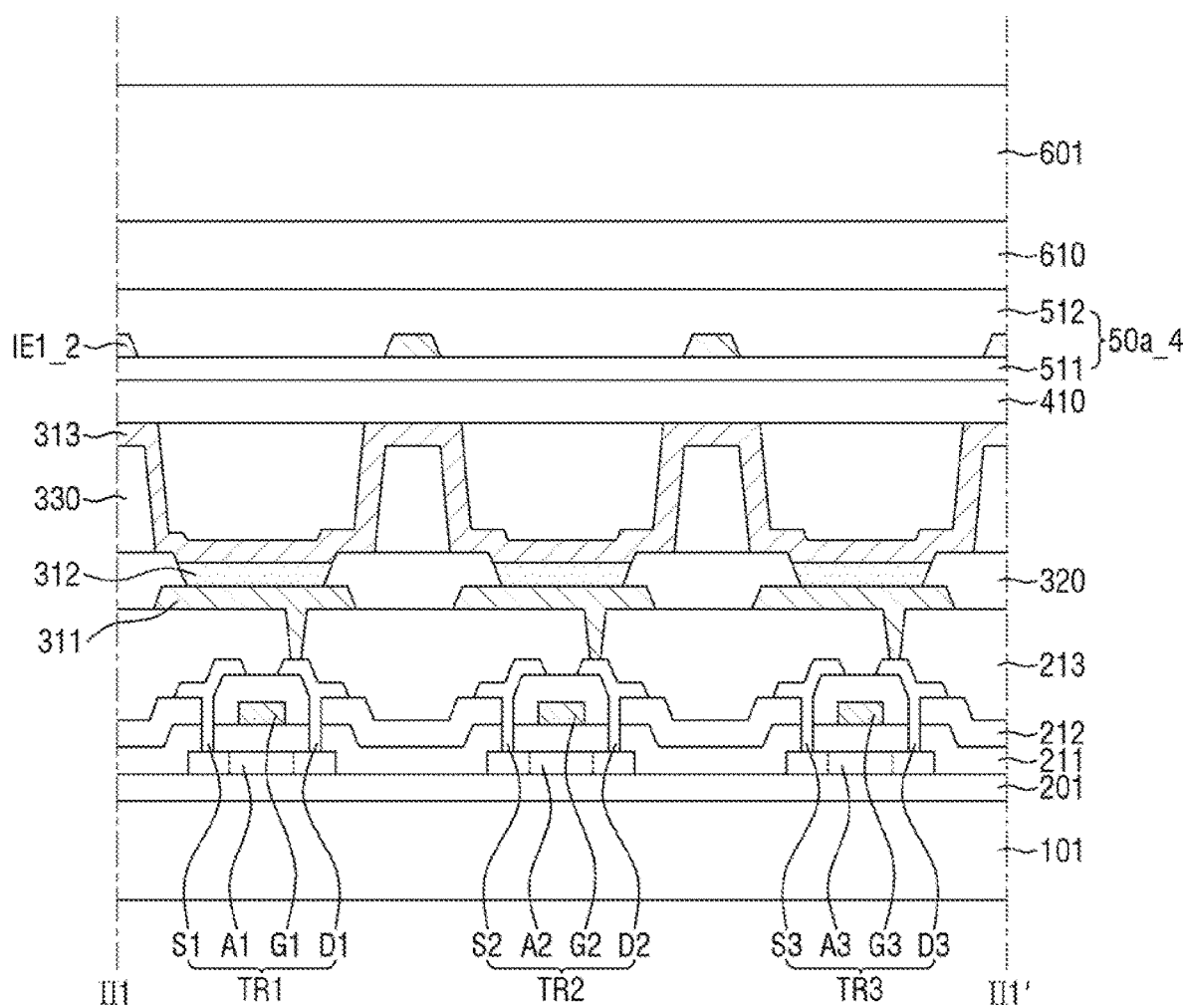
FIG. 16 is a cross-sectional view, taken along line III1-III1' of FIG. 15, of the organic light-emitting display device of FIG. 15.

FIG. 15 is a layout view illustrating the layout of a touch sensing unit of an organic light-emitting display device according to an exemplary embodiment of the present disclosure. FIG. 16 is a cross-sectional view, taken along line II1-II1' of FIG. 15, of the organic light-emitting display device of FIG. 15.

Referring to FIGS. 15 and 16, a touch sensing unit 50a_4 of an organic light-emitting display device 2 differs from the touch sensing unit 50a in that first touch detection electrodes IE1_2 and second touch detection electrodes IE22 have a mesh shape.

The first touch detection electrodes IE1_2 and the second touch detection electrodes IE2_2 have a mesh shape. Since the first touch detection electrodes IE1_2 and the second touch detection electrodes IE2_2 have a mesh shape, the parasitic capacitance between a circuit layer (20 of FIG. 2) and a light-emitting layer (30 of FIG. 2) may be reduced. Since the first touch detection electrodes IE1_2 and the second touch detection electrodes IE2_2 are disposed so as not to overlap with first pixel electrodes 311, the first touch detection electrodes IE1_2 and the second touch detection electrodes IE2_2 can be prevented from becoming visible to a user. For example, the first touch detection electrodes IE1_2 and the second touch detection electrodes IE2_2 may at least partially overlap with a pixel defining film 320.

The first touch detection electrodes IE1_2 and the second touch detection electrodes IE2_2 may include Ag, Al, Cu, Cr, Ni, or Ti that can be processed at low temperature, but the present disclosure is not limited thereto. Even if a touch member is formed in a continuous process, damage to OLEDs can be prevented.

The organic light-emitting display device 2 may include a first touch insulating layer 511, a second touch conductive layer, and a second touch insulating layer 512 sequentially deposited on an encapsulation substrate 410. In one exemplary embodiment of the present disclosure, the first touch detection electrodes IE1_2 and the second touch detection electrodes IE2_2 may be formed on the second touch conductive layer. Here, the first touch conductive layer of FIG. 6 may be omitted.

Figure 17:
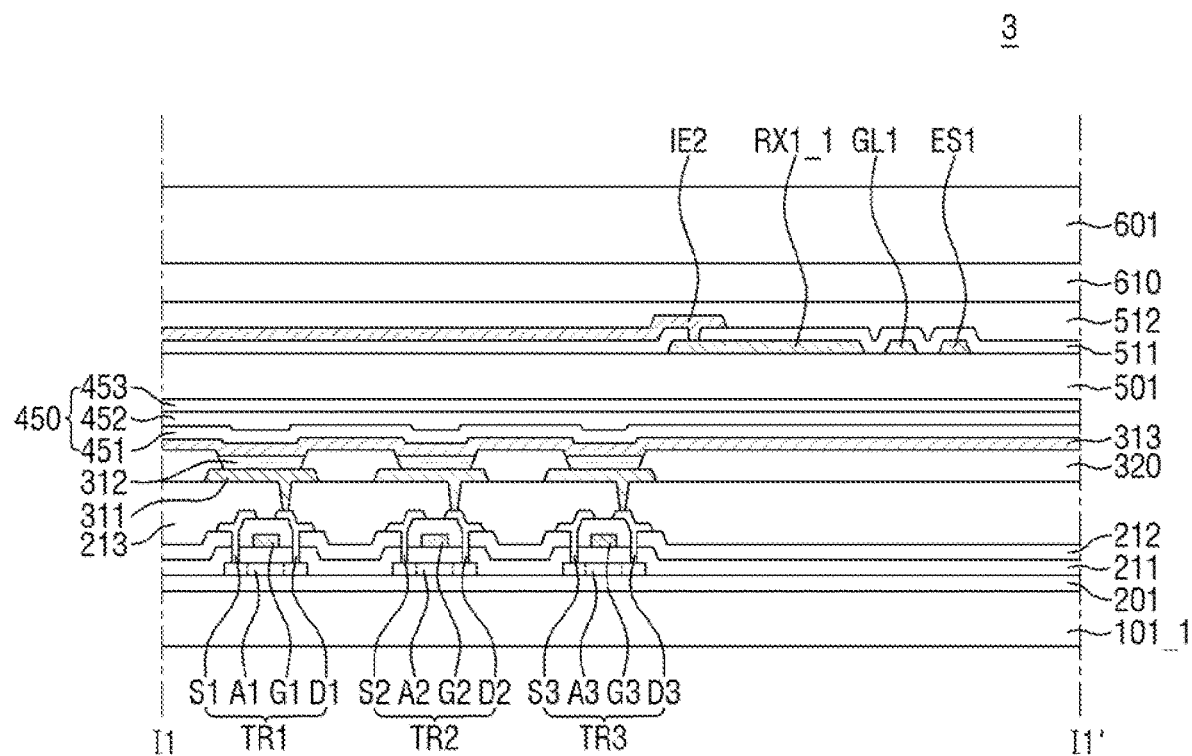
FIG. 17 is a cross-sectional view of an organic light-emitting display device according to an exemplary embodiment of the present disclosure.

FIG. 17 is a cross-sectional view of an organic light-emitting display device according to an exemplary embodiment of the present disclosure. For example, FIG. 17 illustrates a modified example of FIG. 5.

Referring to FIG. 17, an organic light-emitting display device 3 differs from the organic light-emitting display device 1 of FIG. 5 in that it includes an encapsulation film 450, instead of the encapsulation substrate 410 of FIG. 5.

The organic light-emitting display device 3 may have a structure in which a substrate 10, a circuit layer 20, a light-emitting layer 30, an encapsulation layer 40, a touch layer 50, and a cover layer 60 are sequentially stacked, as illustrated in FIG. 2. However, the materials of the elements of the organic light-emitting display device 3 may slightly differ from the materials of the elements of the organic light-emitting display device 1.

A base substrate 101_1 may be a flexible substrate. For example, the base substrate 101_1 may be a film substrate or a plastic substrate including an organic polymer. For example, the base substrate 101_1 may include polystyrene, polyvinyl alcohol, polymethyl methacrylate (PMMA), polyether sulfone (PES), polyacrylate, polyetherimide (PEI), polyethylene naphthalate (PEN), polyethylene terephthalate (PET), polyphenylene sulfide (PPS), polyarylate, PI, polycarbonate (PC), triacetate cellulose, or cellulose acetate propionate (CAP). The base substrate 101_1 may also include fiber glass reinforced plastic (FRP).

Layers or elements ranging from a buffer layer 201 to a second pixel electrode 313 may be sequentially deposited on the base substrate 101_1, as illustrated in FIG. 5, but the spacers 330 of FIG. 5 may be omitted.

The encapsulation film 450 may be disposed on the second pixel electrode 313. The encapsulation film 450 may include an inorganic film and an organic film. The encapsulation film 450 may include a stack of a plurality of films. The encapsulation film 450 may be formed as a multilayer film including a first inorganic film 451, an organic film 452, and a second inorganic film 453 that are sequentially stacked. Here, the first and second inorganic films 451 and 453 may include silicon oxide (SiOx), silicon nitride (SiNx), and/or silicon oxynitride (SiONx), and the organic film 452 may include an epoxy, an acrylate, and/or urethane acrylate. The encapsulation film 450 may correspond to the encapsulation layer 40 of FIG. 2.

A touch substrate 501 may be disposed on the encapsulation film 450. The touch substrate 501 may be formed of plastic such as PET, PI, PC, polyethylene (PE), polypropylene (PP), polysulfone (PSF), PMMA, triacetyl cellulose (TAC), or a cyclo-olefin polymer (COP).

A first touch conductive layer, a first touch insulating layer 511, a second touch conductive layer, and a second touch insulating layer 512 may be sequentially deposited on the touch substrate 501. The touch substrate 501, the first touch conductive layer, the first touch insulating layer 511, the second touch conductive layer, and the second touch insulating layer 512 may correspond to the touch layer 50 of FIG. 2.

In other exemplary embodiments of the present disclosure, the touch substrate 501 may be omitted, in which case, the first conductive layer, the first touch insulating layer 511, the second touch conductive layer, and the second touch insulating layer 512 may be sequentially deposited directly on the encapsulation film 450.

Elements or layers corresponding to the cover layer 60 of FIG. 2 may be sequentially deposited on the second touch insulating layer 512.

Figure 18:
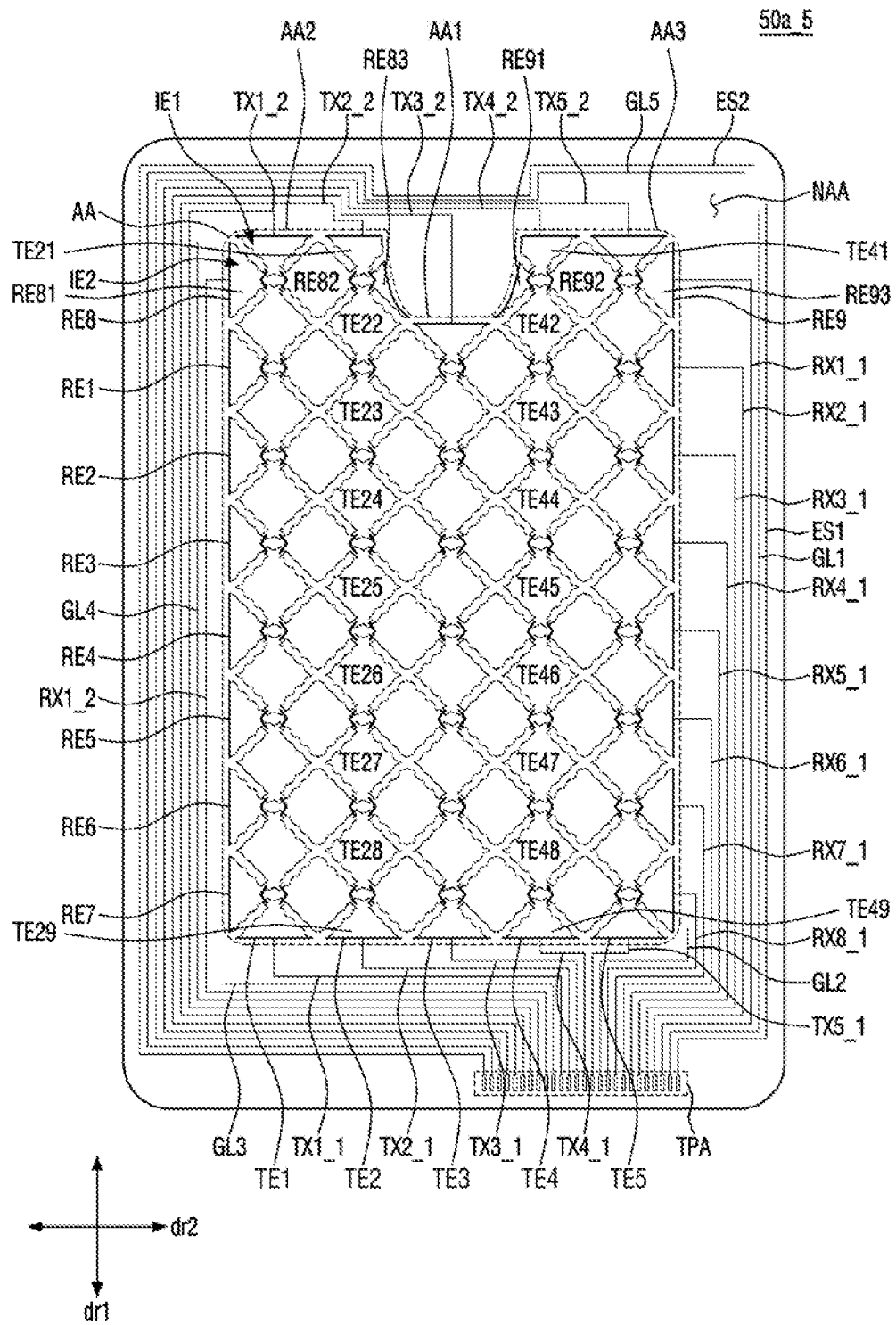
FIG. 18 is a layout view illustrating the layout of a touch sensing unit of an organic light-emitting display device according to an exemplary embodiment of the present disclosure.

FIG. 18 is a layout view illustrating the layout of a touch sensing unit of an organic light-emitting display device according to an exemplary embodiment of the present disclosure.

Referring to FIG. 18, a touch sensing unit 50a_5 differs from the touch sensing unit 50a of FIG. 3 in that second and third sensing areas AA2 and AA3 are relatively wide in a second direction dr2.

The length, in a first direction dr1, of second and fourth driving electrodes TE2 and TE4 may be the same as the length, in the first direction dr1, of first and fifth driving electrodes TE1 and TE5.

The second driving electrode TE2 may include first through ninth driving detection patterns TE21 through TE29. The first driving detection pattern TE21 of the second driving electrode TE2 may be disposed in the second sensing area AA2. The second driving detection pattern TE22 of the second driving electrode TE2 may be disposed not only in the second sensing area AA2, but also in a first sensing area AA1. The third through ninth driving detection patterns TE23 through TE29 of the second driving electrode TE2 may be disposed in the first sensing area AA1.

The fourth driving electrode TE4 may include first through ninth driving detection patterns TE41 through TE49. The first driving detection pattern TE41 of the fourth driving electrode TE4 may be disposed in the third sensing area AA3. The second driving detection pattern TE42 of the fourth driving electrode TE4 may be disposed not only in the third sensing area AA3, but also in the first sensing area AA1. The third through ninth driving detection patterns TE43 through TE49 of the fourth driving electrode TE4 may be disposed in the first sensing area AA1.

An eighth sensing electrode RE8 may cross between the first and second driving electrodes TE1 and TE2. The eighth sensing electrode RE8 may include first through third sensing detection patterns RE81 through RE83. The second and third sensing detection patterns RE82 and RE83 of the eighth sensing electrode RE8 may cross between the first and second driving detection patterns TE21 and TE22 of the second driving electrode TE2.

A ninth sensing electrode RE9 may cross between the fourth and fifth driving electrodes TE4 and TE5. The ninth sensing electrode RE9 may include first through third sensing detection patterns RE91 through RE93. The first and second sensing detection patterns RE91 and RE92 of the ninth sensing electrode RE9 may cross between the first and second driving detection patterns TE41 and TE42 of the fourth driving electrode TE4. The second and third sensing detection patterns RE92 and RE93 of the ninth sensing electrode RE9 may cross between the first and second driving detection patterns TE51 and TE52 of the fifth driving electrode TE5.

Figure 19:
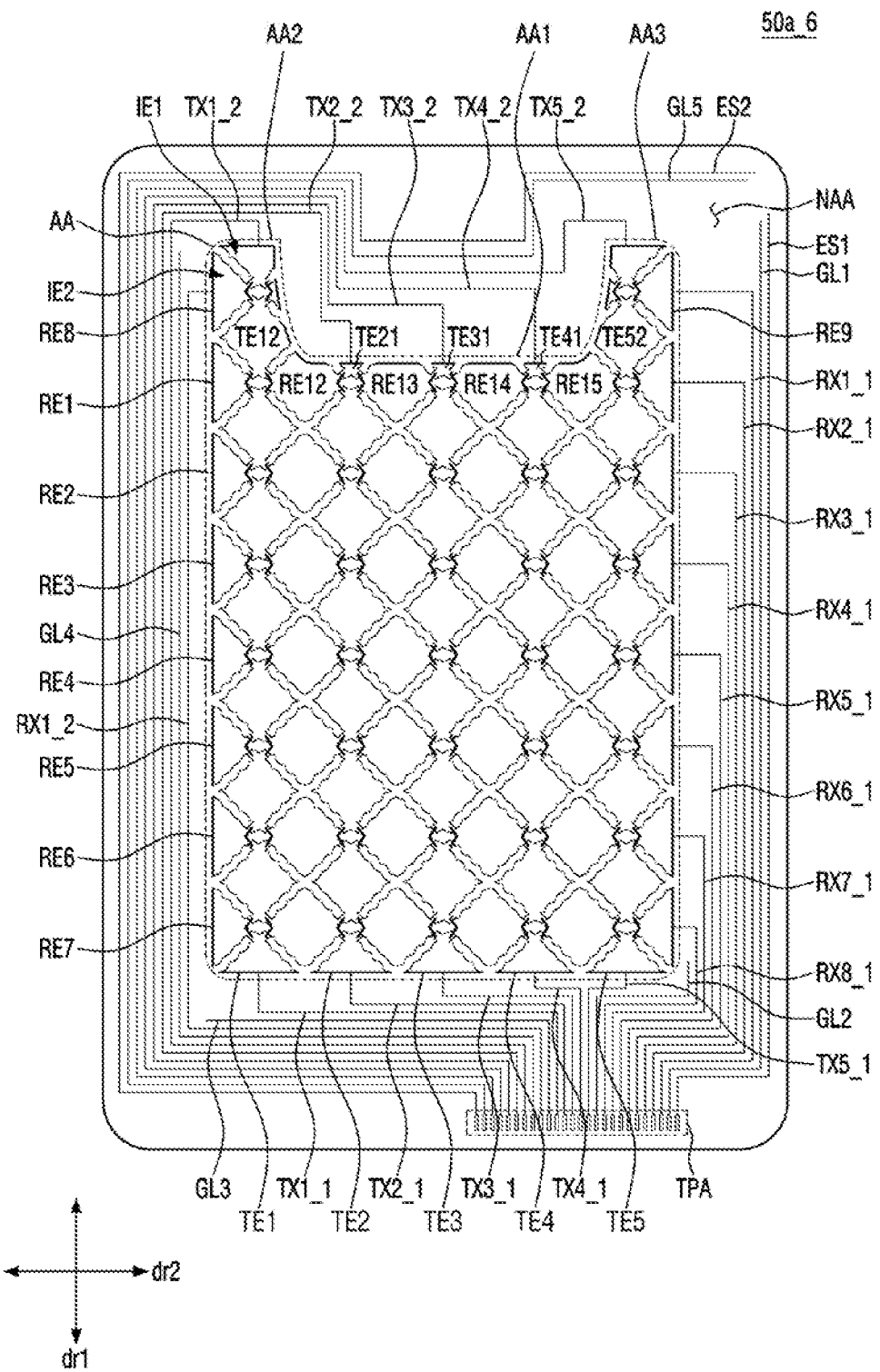
FIG. 19 is a layout view illustrating the layout of a touch sensing unit of an organic light-emitting display device according to an exemplary embodiment of the present disclosure.

FIG. 19 is a layout view illustrating the layout of a touch sensing unit of an organic light-emitting display device according to an exemplary embodiment of the present disclosure.

Referring to FIG. 19, a touch sensing unit 50a_6 differs from the touch sensing unit 50a in that an irregular edge of a sensing area AA is further recessed toward the inside of the sensing area AA.

The sensing area AA may have a shape obtained by cutting off parts of the second driving electrode TE2, the fourth driving electrode TE4, and the second sensing electrode RE2 of FIG. 3 along the boundary between the sensing area AA and a non-sensing area NAA.

Figure 20:
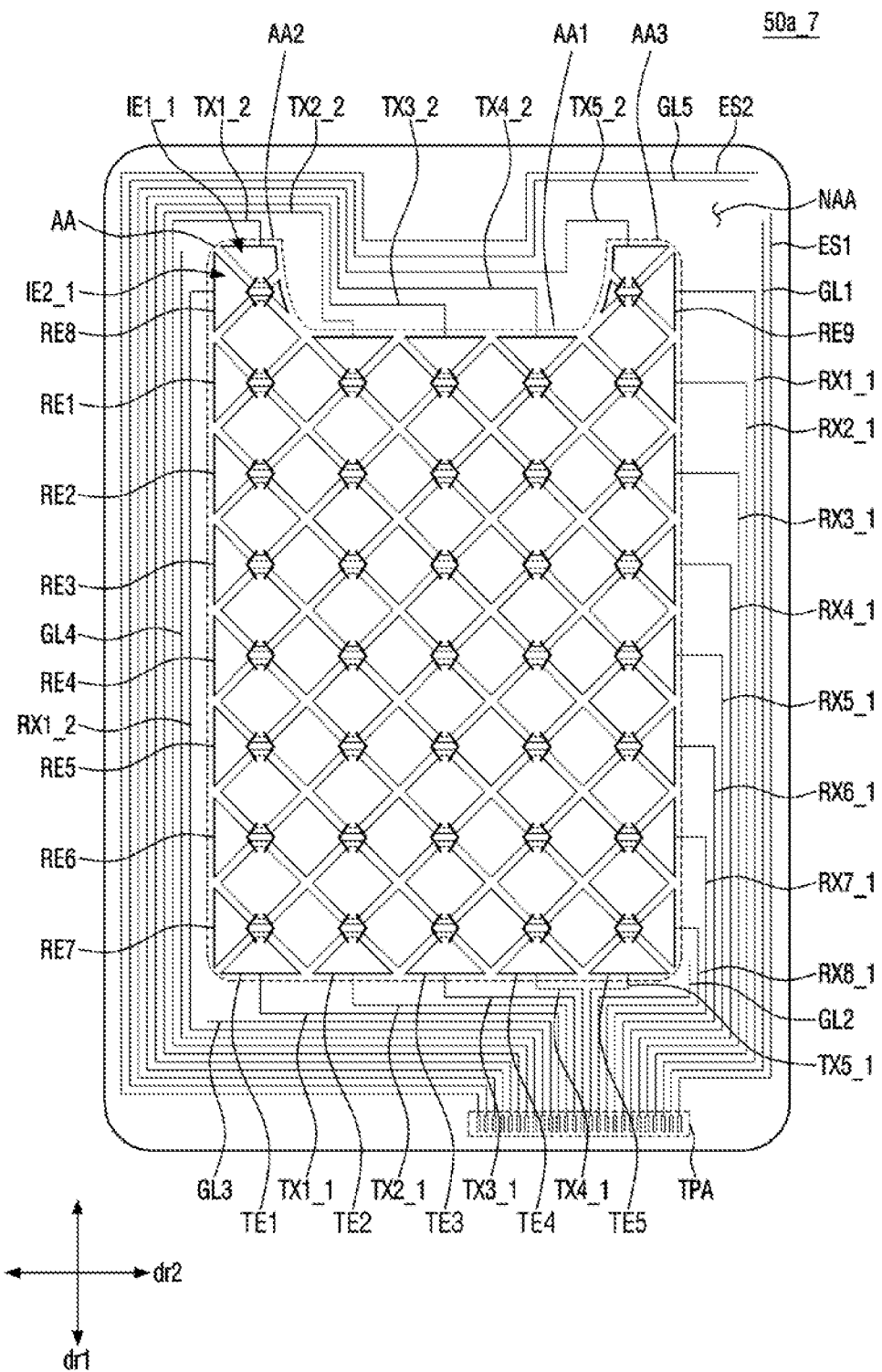
FIG. 20 is a layout view illustrating the layout of a touch sensing unit of an organic light-emitting display device according to an exemplary embodiment of the present disclosure.

FIG. 20 is a layout view illustrating the layout of a touch sensing unit of an organic light-emitting display device according to an exemplary embodiment of the present disclosure.

Referring to FIG. 20, a touch sensing unit 50a_7 differs from the touch sensing unit 50a in that all the sides of each of the driving detection patterns of each first touch detection electrode IE1 and all the sides of each of the sensing detection patterns of each second touch detection electrode IE2 may have a rectilinear shape.

The driving detection patterns of each first touch detection electrode IE1 and the sensing detection patterns of each second touch detection electrode IE2 may form a matrix shape.

Figure 21:
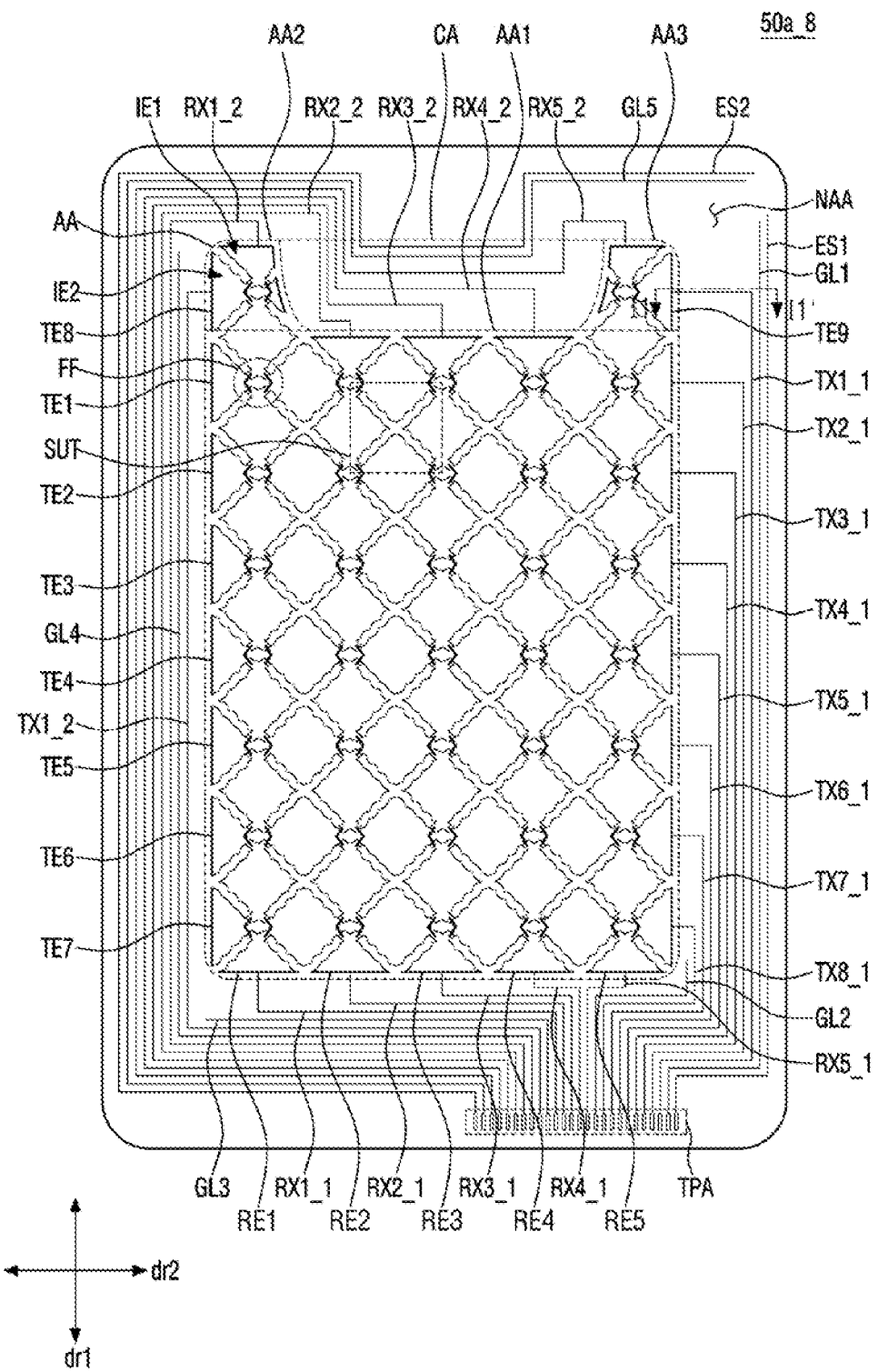
FIG. 21 is a layout view illustrating the layout of a touch sensing unit of an organic light-emitting display device according to an exemplary embodiment of the present disclosure.

FIG. 21 is a layout view illustrating the layout of a touch sensing unit of an organic light-emitting display device according to an exemplary embodiment of the present disclosure.

Referring to FIG. 21, a touch sensing unit 50a_8 differs from the touch sensing unit 50a of FIG. 3 in that the positions of driving electrodes and sensing electrodes are reversed.

First touch detection electrodes IE1 may be sensing electrodes, and second touch detection electrodes IE2 may be driving electrodes. In one exemplary embodiment of the present disclosure, the first touch detection electrodes IE1 may include five sensing electrodes RE1 through RE, i.e., first through fifth sensing electrodes RE1 through RE5, and the second touch detection electrodes IE2 may include nine driving electrodes, i.e., first through ninth driving electrodes TE1 through TE9.

The first through fifth sensing electrodes RE1 through RE5 may extend in a first direction and may be spaced apart from one another in a second direction dr2. The first through ninth driving electrodes TE1 through TE9 may extend in the second direction dr2 and may be spaced apart from one another in the first direction dr1.

Although exemplary embodiments of the present invention have been disclosed for illustrative purposes, those skilled in the art will appreciate that various modifications, additions and substitutions are possible, without departing from the scope and spirit of the present disclosure.

What is claimed is:

1. A touch sensing unit, comprising:
    a base layer having defined thereon a first sensing area, a second sensing area, and a third sensing area, the second and third sensing areas protruding from the first sensing area in a first direction and spaced apart from each other, and a non-sensing area, which is adjacent to the first, second, and third sensing areas;
    a first detection electrode disposed within the first sensing area;
    a second detection electrode disposed within the second sensing area;

a third detection electrode disposed within the third sensing area; and first, second, and third signal wires electrically connected to the first, second, and third detection electrodes, respectively, wherein the first and second signal wires are disposed adjacent to a first edge of the non-sensing area, wherein the third signal wire is disposed adjacent to a second edge of the non-sensing area, wherein the non-sensing area is disposed between the second sensing area and the third sensing area;

wherein the second edge of the non-sensing area is opposite to the first edge of the non-sensing area, and wherein the first and second signal wires are disposed between the second sensing area and the first edge of the non-sensing area and the third signal wires are disposed between the second edge of the non-sensing area and the third sensing area.

2. The touch sensing unit of claim 1, wherein the first detection electrode is a driving electrode, and wherein the second and third detection electrodes are sensing electrodes.

3. The touch sensing unit of claim 1, wherein the first detection electrode includes a plurality of first detection patterns disposed adjacent to one another in the first direction, wherein the second detection electrode includes a plurality of second detection patterns disposed adjacent to one another in a second direction, which intersects the first direction, and wherein the second detection electrode includes a plurality of third detection patterns disposed adjacent to one another in the second direction.

4. The touch sensing unit of claim 3, wherein the second detection electrode further includes first connecting portions physically connecting the second detection patterns to each other, and wherein the third detection electrode further includes second connecting portions physically connecting the third detection patterns to each other.

5. The touch sensing unit of claim 4, wherein the first detection electrode extends to the second sensing area, and wherein the first connecting portions cross between the first detection patterns.

6. The touch sensing unit of claim 3, wherein the first detection patterns are spaced apart from one another.

7. The touch sensing unit of claim 6, wherein the first detection patterns are electrically connected via a plurality of bridge electrodes.

8. The touch sensing unit of claim 3, wherein the second detection patterns and the third detection patterns are not connected to each other by signal wires.

9. The touch sensing unit of claim 1, wherein the non-sensing, area includes a central area disposed between the second and third sensing areas, and wherein the first signal wire passes through the central area.

10. The touch sensing unit of claim 9, wherein the first signal wire is connected to a first end of the first detection electrode, and wherein the touch sensing unit further comprises a fourth signal wire connected to a second end of the first detection electrode.

11. The touch sensing unit of claim 1, further comprising: a guard, wire disposed between the first and second signal wires.

12. The touch sensing unit of claim 1, further comprising: a plurality of antistatic wires at least partially surrounding each of the first, second, and third signal wires.

13. The touch sensing unit of claim 1, wherein the second detection electrode includes at least two detection patterns having differently sized areas.

14. The touch sensing unit of claim 1, wherein the non-sensing area includes a central area disposed between the second and third sensing areas, and wherein the second sensing area, the central area, and the third sensing area are adjacent one another in a second direction, which intersects the first direction.

15. The touch sensing unit of claim 14, wherein the second and third sensing areas at least partially overlap with each other in the second direction.

16. A display device, comprising:
a first detection electrode including a plurality of first detection patterns disposed adjacent to one another in a first direction;
a second detection electrode including a plurality of second detection patterns disposed adjacent to one another in a second direction, which intersects the first direction;
a third detection electrode including a plurality of third detection patterns disposed adjacent to one another in the second direction;
a first signal wire electrically connected to the first detection electrode;
a second signal wire electrically connected to the second detection electrode; and
a third signal wire electrically connected to the third detection electrode,
wherein the second detection electrode crosses between the first detection patterns,
wherein the second and third detection electrodes are spaced apart from one another forming a notch that is adjacent to the first detection electrode and disposed between the second and third detection electrodes in which no detection electrodes are disposed,
wherein the second and third detection electrodes at least partially overlap with each other in the second direction, and
wherein the second and third signal wires are not disposed within the notch between the second and third detection electrodes.

17. The display device of claim 16, further comprising:
a base layer having defined thereon a sensing area and a non-sensing area, which at least partially surrounds the sensing area,
wherein the first, second, and third detection electrodes are disposed within the sensing area of the base layer,
wherein the first, second, and third signal wires are disposed within the non-sensing area of the base layer,
wherein the first and second signal wires are disposed adjacent to a first edge of the non-sensing area, and
wherein the third signal wire is disposed adjacent to a second edge of the non-sensing area.

18. The display device of claim 16, further comprising:
a fourth detection electrode including a plurality of fourth detection patterns disposed adjacent to one another in the first direction; and
a fifth detection electrode including a plurality of fifth detection patterns disposed adjacent to one another in the first direction,
wherein the fourth and fifth detection electrodes are disposed adjacent to the first detection electrode in the second direction.

19. The display device of claim 18, wherein the fourth detection electrode is disposed between the first and fifth detection electrodes, and wherein the third detection patterns cross between the fifth detection patterns.

20. The display device of claim 19, wherein the second detection patterns do not cross between the fourth detection patterns, wherein the second detection patterns do not cross between the fifth detection patterns, wherein the third detection patterns do not cross between the first detection patterns, and wherein the third detection patterns do not cross between the fourth detection patterns.

21. The display device of claim 19, wherein a length, in the first direction, of the first and fifth detection electrodes is greater than a length, in the first direction, of the fourth detection electrode.

22. The display device of claim 18, wherein the first detection electrode includes a first protruding portion protruding beyond the fourth detection electrode toward a first side in the first direction, and wherein the fifth detection electrode includes a second protruding portion protruding, beyond the fourth detection electrode toward the first side in the first direction.

23. The display device of claim 22, wherein the first and second protruding portions at least partially overlap with each other in the second direction.

24. The display device of claim 22, wherein the second detection electrode extends across the first protruding portion, and wherein the third detection electrode extends across the second protruding portion.

25. The display device of claim 18, further comprising: a fourth signal wire connected to the fourth detection electrode, wherein the fourth signal wire is disposed between the second and third detection electrodes.

26. The display, device of claim 16, wherein the first signal wire is configured to apply a driving signal to the first detection electrode, wherein the second signal wire is configured to apply a first sensing signal to the second detection electrode, and wherein the third signal wire is configured to apply a second sensing signal to the third detection electrode.

27. The display device of claim 16, wherein, the first and second signal wires are disposed between the second detection electrode and the notch and the third signal wires are disposed between the notch and the third sensing electrode.

* * * * *